(12) United States Patent
Wheelwright et al.

(10) Patent No.: US 11,048,087 B2
(45) Date of Patent: Jun. 29, 2021

(54) OPTICAL ASSEMBLIES HAVING POLARIZATION VOLUME GRATINGS FOR PROJECTING AUGMENTED REALITY CONTENT

(71) Applicant: FACEBOOK TECHNOLOGIES, LLC, Menlo Park, CA (US)

(72) Inventors: Brian Wheelwright, Sammamish, WA (US); Yun-Han Lee, Redmond, WA (US); Babak Amirsolaimani, Redmond, WA (US); Weichuan Gao, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/436,729

(22) Filed: Jun. 10, 2019

(65) Prior Publication Data
US 2021/0096453 A1  Apr. 1, 2021

(51) Int. Cl.
*G02B 27/01* (2006.01)

(52) U.S. Cl.
CPC ....... *G02B 27/0172* (2013.01); *G02B 27/017* (2013.01)

(58) Field of Classification Search
CPC .......................... G02B 27/017; G02B 27/0172
See application file for complete search history.

(56) References Cited

U.S. PATENT DOCUMENTS

| | | | | |
|---|---|---|---|---|
| 5,726,807 A * | 3/1998 | Nakaoka | ............ | G02B 27/0172 359/630 |
| 5,777,794 A * | 7/1998 | Nakaoka | ............ | G02B 27/0172 345/7 |
| 5,949,583 A * | 9/1999 | Rallison | ............ | G02B 6/08 359/631 |
| 6,097,543 A * | 8/2000 | Rallison | ............ | G02B 27/0172 359/630 |
| 9,933,684 B2 * | 4/2018 | Brown | ............ | G02B 5/1814 |
| 10,108,011 B2 * | 10/2018 | Nikkhoo | ............ | G02B 27/0081 |
| 10,120,194 B2 * | 11/2018 | Cobb | ............ | G02B 1/18 |
| 10,649,210 B2 * | 5/2020 | Cobb | ............ | G02B 1/11 |
| 2006/0228073 A1 | 10/2006 | Mukawa et al. | | |

(Continued)

OTHER PUBLICATIONS

Facebook Technologies, LLC, International Search Report and Written Opinion, PCT/US2020/034754, dated Sep. 16, 2020, 9 pgs.

(Continued)

*Primary Examiner* — Bao-Luan Q Le
(74) *Attorney, Agent, or Firm* — Morgan, Lewis & Bockius LLP

(57) ABSTRACT

An optical assembly for projecting light from a display includes a first optical waveguide, a reflective optical element configured, and a first in-coupler. The reflective optical element is configured to receive first light having first polarization from the display and to reflect the first light as second light having second polarization distinct from the first polarization. The first in-coupler is coupled with the first optical waveguide. The first in-coupler is configured to receive and transmit the first light. The first in-coupler is further configured to receive the second light and redirect a first portion of the second light so that the first portion of the second light undergoes total internal reflection inside the first optical waveguide.

19 Claims, 19 Drawing Sheets

(56) References Cited

U.S. PATENT DOCUMENTS

| | | | |
|---|---|---|---|
| 2006/0268421 A1 | 11/2006 | Shimizu et al. | |
| 2014/0140653 A1* | 5/2014 | Brown | G02B 27/0172 385/10 |
| 2014/0140654 A1* | 5/2014 | Brown | G02B 27/0172 385/10 |
| 2016/0041390 A1* | 2/2016 | Poon | G02B 17/08 345/8 |
| 2016/0077338 A1* | 3/2016 | Robbins | G02B 6/0016 345/8 |
| 2016/0252724 A1* | 9/2016 | Nikkhoo | G02B 27/0081 359/630 |
| 2017/0010466 A1 | 1/2017 | Klug et al. | |
| 2017/0212352 A1* | 7/2017 | Cobb | G02B 27/0176 |
| 2018/0067315 A1 | 3/2018 | Amitai et al. | |
| 2018/0082644 A1 | 3/2018 | Bohn | |
| 2018/0120559 A1* | 5/2018 | Yeoh | G02B 5/3083 |
| 2018/0120563 A1 | 5/2018 | Kollin et al. | |
| 2018/0136473 A1* | 5/2018 | Cobb | G02B 17/0856 |
| 2018/0164583 A1* | 6/2018 | Wall | G02B 27/1086 |
| 2018/0239177 A1 | 8/2018 | Oh | |
| 2018/0373115 A1* | 12/2018 | Brown | G02B 5/1814 |
| 2019/0179149 A1 | 6/2019 | Curtis et al. | |

OTHER PUBLICATIONS

Wheelwright, Office Action, U.S. Appl. No. 16/436,736, filed Jul. 16, 2020, 24 pgs.
Wheelwright, Office Action, U.S. Appl. No. 16/438,034, filed Jul. 16, 2020, 25 pgs.
Wheelwright, Notice of Allowance, U.S. Appl. No. 16/436,736, filed Nov. 17, 2020, 10 pgs.
Wheelwright, Final Office Action, U.S. Appl. No. 16/438,034, filed Jan. 21, 2021, 32 pgs.

* cited by examiner

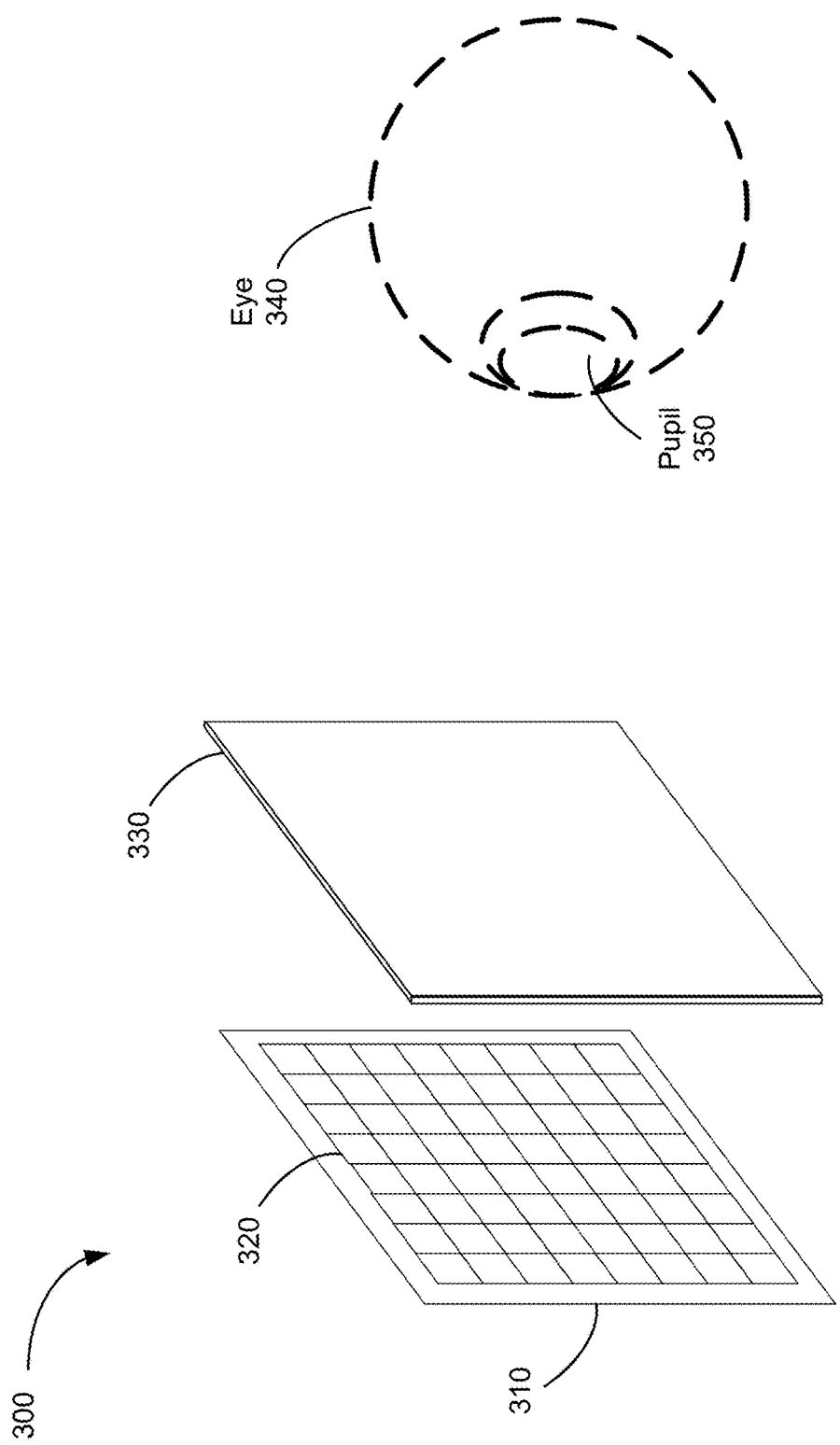

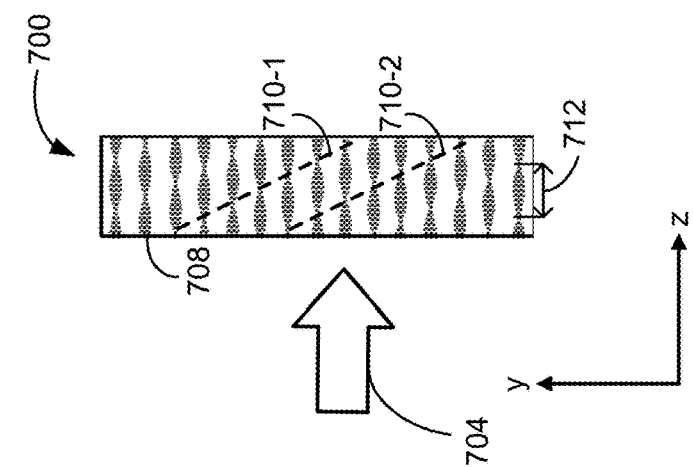
Figure 7C
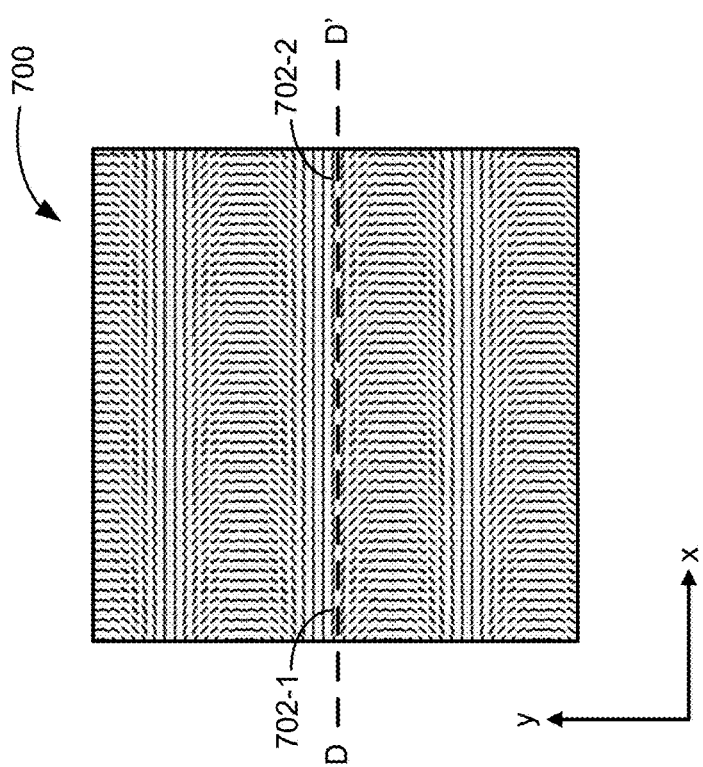
Figure 7B
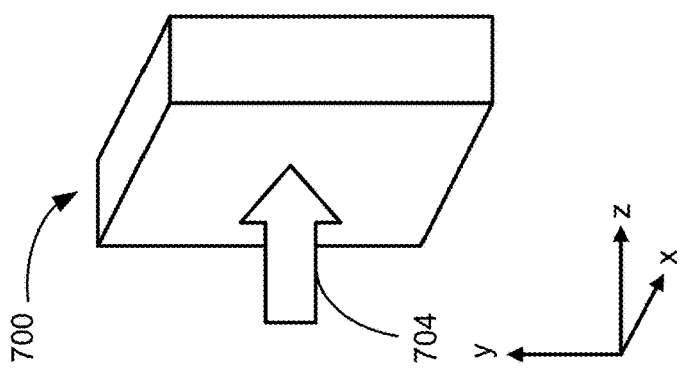
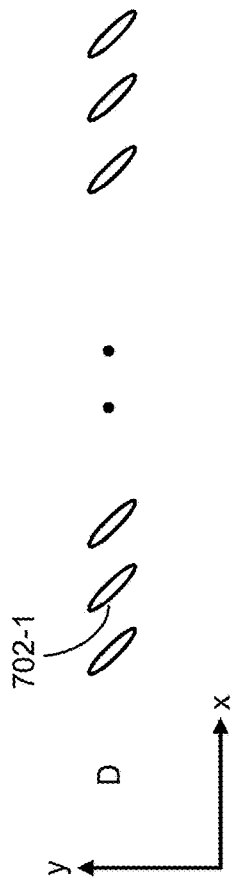
Figure 7A
Figure 7D

OPTICAL ASSEMBLIES HAVING POLARIZATION VOLUME GRATINGS FOR PROJECTING AUGMENTED REALITY CONTENT

RELATED APPLICATIONS

This application is related to U.S. patent application Ser. No. 16/436,736, entitled "Optical Assemblies Having Scanning Reflectors for Projecting Augmented Reality Content" filed Jun. 10, 2019 and U.S. patent application Ser. No. 16/438,034, entitled "Optical Devices Including Reflective Spatial Light Modulators for Projecting Augmented Reality Content" filed Jun. 11, 2019.

TECHNICAL FIELD

This relates generally to display devices, and more specifically to head-mounted display devices.

BACKGROUND

Head-mounted display devices (also called head-mounted displays) are gaining popularity as means for providing visual information to a user. For example, the head-mounted display devices are used for virtual reality and augmented reality operations. However, the size and weight of conventional head-mounted displays limit their applications.

Generally, head-mounted display devices with a wide field of view are desired for improved user experience. This makes it even more challenging to reduce the sizes of head-mounted display devices.

SUMMARY

Accordingly, there is a need for a compact head-mounted display devices capable of rendering images with a wide field of view to enhance users' overall experience of augmented and/or virtual reality.

The above deficiencies and other problems associated with conventional head-mounted displays are reduced or eliminated by the disclosed optical assembly configured to direct light from a display to a user's eye. The optical assembly has a compact configuration that provides a folded optical path for projecting images from the display to the user's eye, thereby increasing an effective focal length for projecting the images. The increased effective focal length results in a wider field of view for a head-mounted display device employing the optical assembly.

In accordance with some embodiments, an optical assembly for projecting light from a display includes a first optical waveguide, a reflective optical element, and a first in-coupler. The reflective optical element is configured to receive first light having first polarization from the display and to reflect the first light as second light having second polarization distinct from the first polarization. The first in-coupler is coupled with the first optical waveguide. The first in-coupler is configured to receive and transmit the first light. The first in-coupler is further configured to receive the second light and redirect a first portion of the second light so that the first portion of the second light undergoes total internal reflection inside the first optical waveguide.

In accordance with some embodiments, a method of projecting light from an electronic display includes transmitting first light having first polarization from the display through one or more optical components. The one or more optical components include a first in-coupler and a first optical waveguide. The method includes receiving, by a reflective optical element, the first light transmitted through the one or more optical components am reflecting, by the reflective optical element, the first light as second light having second polarization distinct from the first polarization. The method includes receiving, by the first in-coupler, the second light and redirecting, by the first in-coupler, a first portion of the second light so that the first portion of second light undergoes total internal reflection inside the first optical waveguide.

In accordance with some embodiments, a display device includes a display, a first optical waveguide, and a reflective optical component. The display is configured to output first light having first polarization. The reflective optical element is configured to receive the first light from the display and to reflect the first light as second light having second polarization distinct from the first polarization. The first in-coupler is coupled with the first optical waveguide. The first in-coupler is configured to receive and transmit the first light and receive the second light and redirect a first portion of the second light so that the first portion of the second light undergoes total internal reflection inside the first optical waveguide.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 7A-7D are schematic diagrams illustrating a polarization volume grating in accordance with some embodiments.

Figure 1:
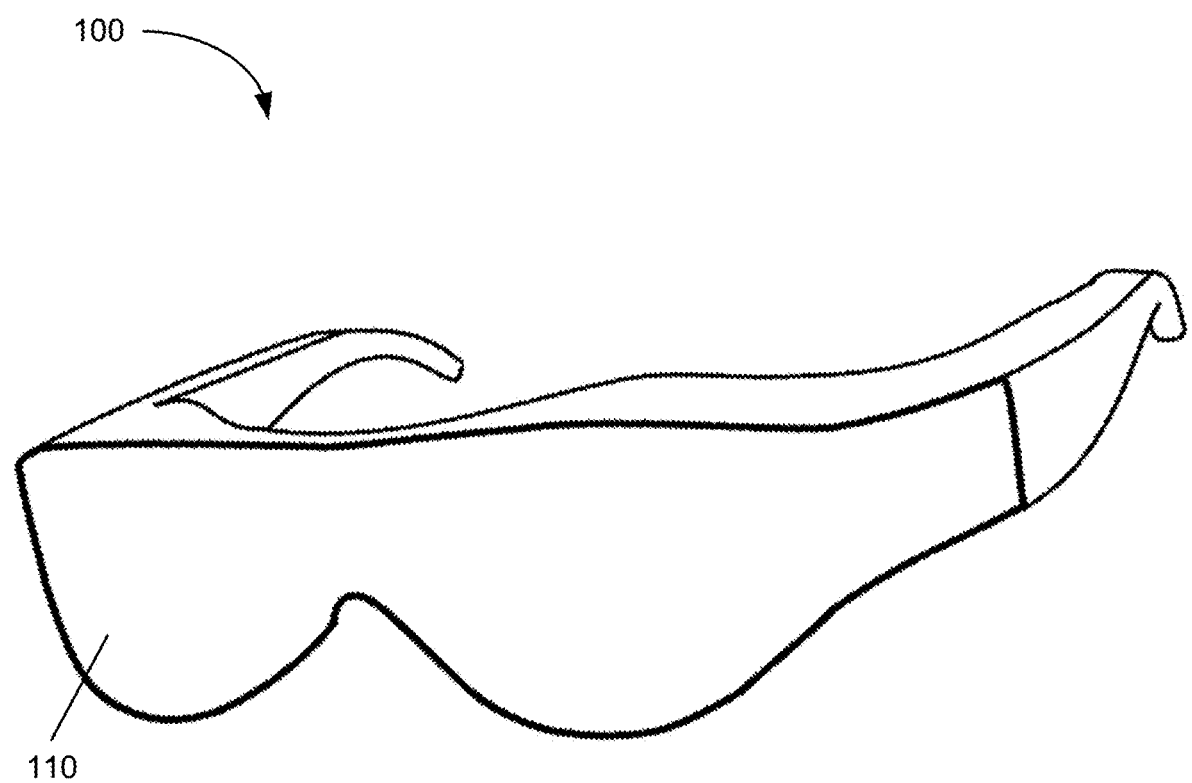
FIG. 1 is a perspective view of a display device in accordance with some embodiments.

These figures are not drawn to scale unless indicated otherwise.

DETAILED DESCRIPTION

The present disclosure provides a head-mounted display device (or a display device) including an optical assembly for projecting augmented reality content to an eye of a user. The optical assembly includes a reflector and one or more waveguides with polarization selective in-couplers. The optical assembly is configured to receive light from a display. The light from the display corresponds to images including augmented reality content. The one or more optical waveguides of the optical assembly are configured to output at least a portion of the light toward the eye of the user. The one or more waveguides are also configured to transmit light from outside the display device, thereby combining the images from the display with a real-world view.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first optical waveguide could be termed a second optical waveguide, and, similarly, a second optical waveguide could be termed a first optical waveguide, without departing from the scope of the various described embodiments. The first optical waveguide and the second optical waveguide are both optical waveguide, but they are not the same optical waveguide.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user. In some embodiments, display 110 is a clip-on display. A clip-on display is configured to be coupled (e.g., clipped on) to a frame of a headset (e.g., a frame of goggles) for displaying visual contents. The clip-on display is further configured to be un-coupled from the frame of the headset.

Figure 2:
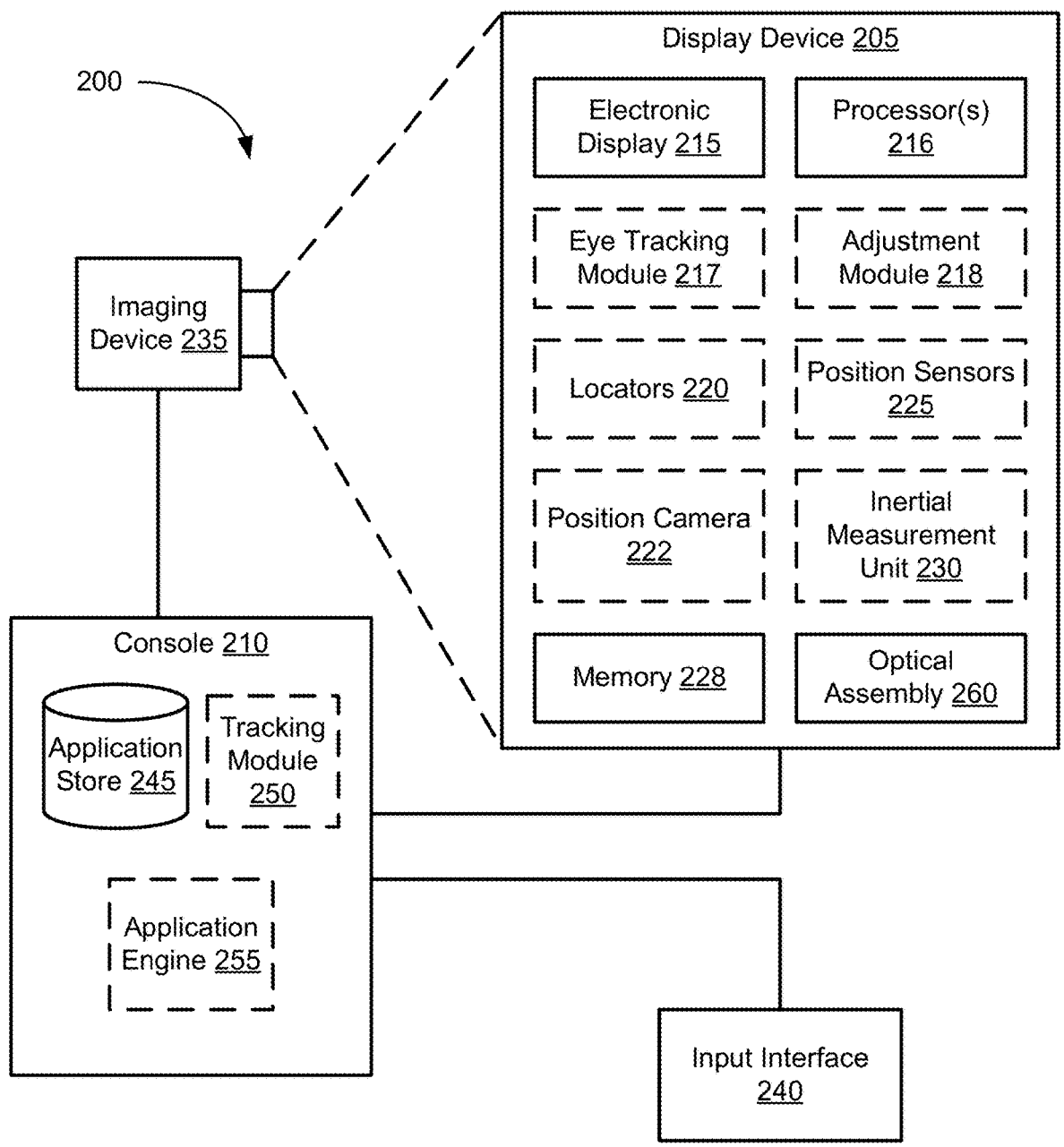
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field-of-view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of a display device 300, which corresponds to part of or all of display device 100 (see FIG. 1) in accordance with some embodiments. In some embodiments, display device 300 includes an emission surface 310 (e.g., a light emission device array), and an optical assembly (e.g., optical assembly 260) having one or more optical components 330 (e.g., one or more of lenses, reflectors, waveguides, and/or polarization selective in-couplers described below with respect to FIGS. 4A-7D). In some embodiments, display device 300 also includes an IR detector array.

In some embodiments, light emission device array 310 emits image light and optional IR light toward the optical components 330. Light emission device array 310 may be, e.g., an array of LEDs, an array of microLEDs, an array of OLED s, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from emission surface 310, and direct the image light to a detected or presumed location of the pupil 350 of an eye 340 of a user.

In some embodiments, the one or more optical components include one or more optical assemblies 260.

Figure 4A:
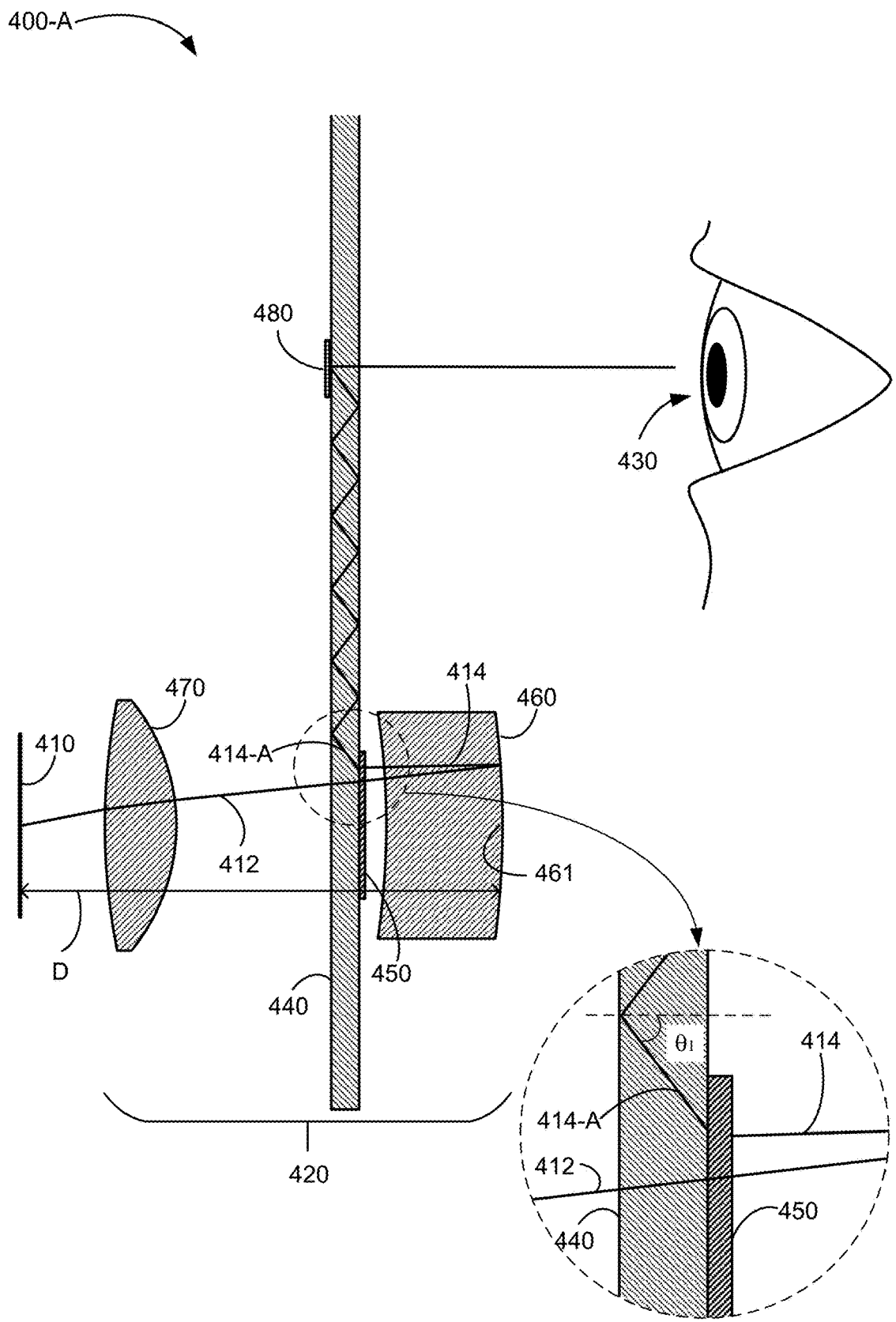
FIG. 4A is a schematic diagram illustrating a display device in accordance with some embodiments.

FIG. 4A is a schematic diagram illustrating a display device 400-A in accordance with some embodiments. The display device 400-A includes an electronic display (display) 410 configured to emit image light (e.g., first light 412) having first polarization and an optical assembly 420 configured to project the image light from the display 410 toward an eye 430 of a user, according to some embodiments.

As shown in FIG. 4A, the optical assembly 420 includes a first optical waveguide 440, a first in-coupler 450 coupled with the first optical waveguide 440, and a reflective optical element 460.

In some embodiments, the first in-coupler 450 is a polarization selective element. For example, a polarization selective element transmits light having first polarization (e.g., first circular polarization or first linear polarization) and redirects light having second polarization distinct from the first polarization (e.g., second circular polarization orthogonal to the first circular polarization or second linear polarization orthogonal to the first linear polarization). In some embodiments, first in-coupler 450 is a liquid crystal based polarization selective element, a polarization selective element including a metasurface, a polarization selective element including a resonant structured surface, a polarization selective element including a continuous chiral layer, or a polarization selective element including a birefringent material. For example, a polarization selective element including a continuous chiral layer can be selective on circularly polarized light. As another example, a polarization selective element including a metasurface or resonant structures can be selective either on linearly polarized light or circularly polarized light. In some embodiments, the first in-coupler 450 is a polarization volume grating (PVG) (e.g., a polarization volume grating 700 described below with respect to FIGS. 7A-7D). A PVG (e.g., PVG 700) is selective with respect to circular polarization, incident angle, and/or wavelength range of light incident thereon. For example, the PVG 700 may transmit light having first circular polarization and diffract light having a circular polarization that is orthogonal to the first circular polarization.

Figure 4B:
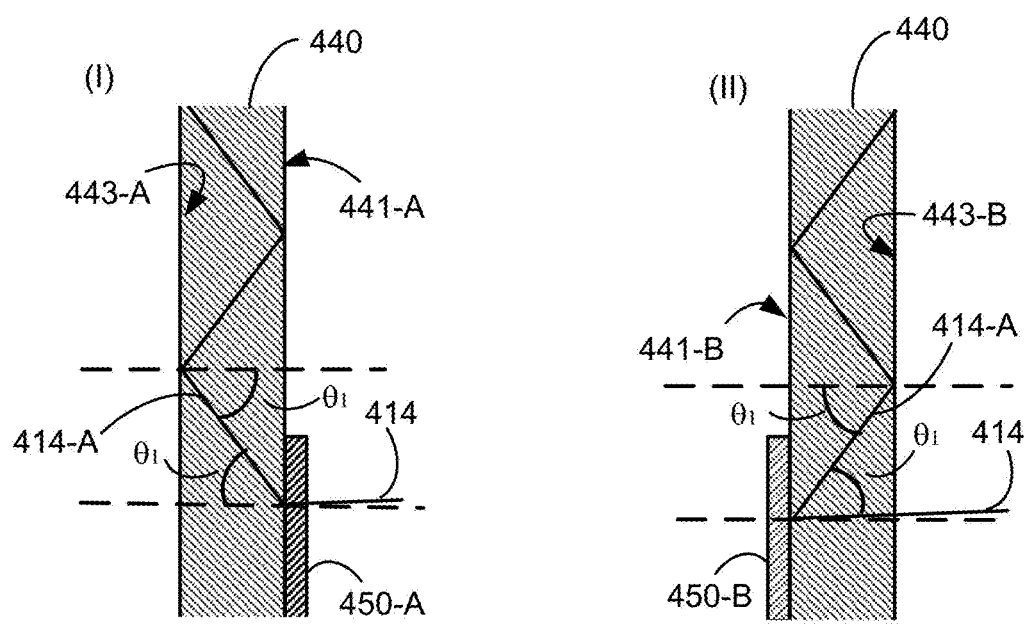
FIG. 4B includes schematic diagrams illustrating a transmission polarization volume grating (Diagram (I)) and a reflective polarization volume grating (Diagram (II)), in accordance with some embodiments.

In some embodiments, as shown in FIG. 4A, the first in-coupler 450 and a portion of the first optical waveguide 440 are positioned between the display 410 and the reflective optical element 460. The first optical waveguide 440 and the first in-coupler 450 are configured to receive the image light (e.g., first light 412) emitted by display 410 and to transmit the image light (e.g., first light 412) toward reflective optical element 460 without changing its direction or polarization. In some embodiments, image light 412 has first circularly polarization, and the reflective optical element 460 is configured to receive image light 412 and to reflect image light 412 as second light 414 having second circular polarization. The second circular polarization is distinct from the first circular polarization (i.e., the first circular polarization corresponds to right-handed circular polarization and the second circular polarization corresponds to left-handed circular polarization, or vice versa). In some embodiments, as shown in FIG. 4F, image light 412 has first linear polarization, and optical assembly 420 further includes an optical element 463 configured to convert the image light 412 into first light 413 having first circular polarization. The reflective optical element 460 is then configured to receive first light 413 and to reflect first light 413 as second light 414 having second circular polarization, and the optical element 463 is configured to convert the second light 414 from having the second circular polarization to having second linear polarization that is orthogonal to the first linear polarization.

The first in-coupler 450 is further configured to receive the second light 414 reflected off the reflective optical element 460, and to diffract or redirect at least a portion of the second light 414, i.e., a first portion 414-A of the second light 414. Due to the redirection by the first in-coupler 450, the first portion 414-A of the second light 414 impinges on a surface of the first optical waveguide 440 at an incident angle $\theta_1$ that is above a critical angle associated with the first optical waveguide 440, as shown in the inset of FIG. 4A. The critical angle refers to an angle of incidence above which light passing through a denser medium (e.g., waveguide 440) to a surface of a less dense medium (e.g., air outside waveguide 440) is totally reflected (i.e., the critical angle is an angle of incidence above which a total internal reflection occurs). The first portion 414-A of the second light 414 thereby undergoes total internal reflection inside the first optical waveguide 440 and propagates through the waveguide via repeated occurrences of total internal reflection, as shown by the zig-zagging light path of the first portion 414-A of the second light 414 in FIG. 4A.

In some embodiments, the display 410 corresponds to light emission device array 310 of the display device 300. In some embodiments, the display 410 is a two-dimensional display configured to emit light having a particular polarization. In some embodiments, the display 410 is an array of micro light emitting diodes (microLED), a liquid crystal on silicon (LCOS) display coupled with a polarization beam splitter, or a ferroelectric LCOS (fLCOS) display coupled with a polarization beam splitter.

As show in in FIG. 4A, the display device 400-A further includes one or more output couplers 480 coupled with the first optical waveguide 440. The one or more output couplers 480 are positioned at a distance from the first in-coupler 450. The one or more output couplers 480 are configured to redirect at least a portion of the first portion 414-A of the second light 414 out of the first optical waveguide 440 toward the eye 430 of the user. In some embodiments, the one or more output couplers 480 include one or more surface relief gratings. In some embodiments, the one or more output couplers 480 include one or more reflectors, one or more partial reflectors, one or more gratings, one or more tunable liquid crystal components, and/or one or more polarization volume gratings. In some embodiments, the one or more output couplers 480 are configured to redirect the first portion 414-A of the second light 414 to the eye 430 while also expanding etendue of the light 412 in the optical assembly 420. Etendue refers to a property of light in an optical system characterizing how "spread out" the light is in area and angle. An original input pupil area of light 412 is increased by replication due to multiple interactions with the one or more output couplers 480.

In some embodiments, the optical assembly 420 further includes one or more lenses 470 between the display 410 and the first waveguide 440, as discussed below with reference to FIGS. 5A-5B.

In some embodiments, the display device 400-A is a head-mounted display device. In some embodiments, the display device 400-A corresponds to the display device 100 described above with respect to FIG. 1. In some embodiments, the display device 400-A is a clip-on display configured to be coupled to a frame of a headset (e.g., a frame of goggles).

The optical assembly 420 provides a folded optical path from the display 410 to the eye 430 of the user, resulting in an increased field-of view while maintaining a compact size of the optical assembly 420 for head-mounted display devices. In some embodiments, the distance D corresponding to a distance between the display 410 and a reflective surface 461 of the reflective optical element 460 is equal to, or less than, 3 mm, 5 mm, 7 mm, 10 mm, 15 mm, 20 mm, 25 mm, or 30 mm, while an optical path provided by optical assembly can be longer than, e.g., twice, three times, or even five times, the distance D.

The first in-coupler 450 can be a transmission grating or a reflective grating. FIG. 4B includes schematic diagrams illustrating a transmission grating 450-A coupled with the first optical waveguide 440 (Diagram (I)) and a reflective grating 450-B coupled with the first optical waveguide 440 (Diagram (II)), in accordance with some embodiments. Either transmission grating 450-A or reflective grating 450-B can be used as the first in-coupler 450 of display device 400-A. The transmission grating 450-A and the reflective grating 450-B are each configured to transmit light having the first polarization without changing its direction or polarization. The transmission grating 450-A is further configured to transmit and redirect light having the second polarization. The reflective grating 450-B is further configured to reflect and redirect the light having the second polarization. Diagram (I) of FIG. 4B shows the transmission grating 450-A being employed as the first in-coupler 450 in optical assembly 420 and disposed on an external surface 441-A of the first optical waveguide 440, so that the second light 414 impinges on the first in-coupler 450 before propagating through any portion of the first optical waveguide 440. The transmission grating 450-A is configured to redirect the first portion 414-A of second light 414 such that the first portion 414-A of second light 414 enters the first optical waveguide 440 at the incident angle $\theta_1$ that is greater than the critical angle associated with the first optical waveguide 440. The first portion 414-A of the second light 414 thereby undergoes total internal reflection as is impinges on an opposite internal surface 443-A of the first optical waveguide 440. Diagram (II) of FIG. 4B shows the reflective grating 450-B disposed on an external surface 441-B of the first optical waveguide 440 so that the second light 414 propagates through the first optical waveguide 440 prior to impinging on the reflective grating 450-B. The reflective grating 450-B is configured to deflect the first portion 414-A of second light 414 toward an opposing internal surface 443-B of first optical waveguide 440 such that the first portion 414-A of second light 414 impinges on the opposing internal surface 443-B at the incident angle $\theta_1$ that is greater than the critical angle associated with the first optical waveguide 440. The first portion 414-A of the second light 414 thereby undergoes total internal reflection and continues to propagate along the first optical waveguide 440.

In some embodiments, the transmission grating 450-A or the reflective grating 450-B can be a thin film coated on an external surface the first optical waveguide 440. In some embodiments, the transmission grating 450-A or the reflective grating 450-B can be at least partially embedded in the first optical waveguide 440.

Figure 4C:
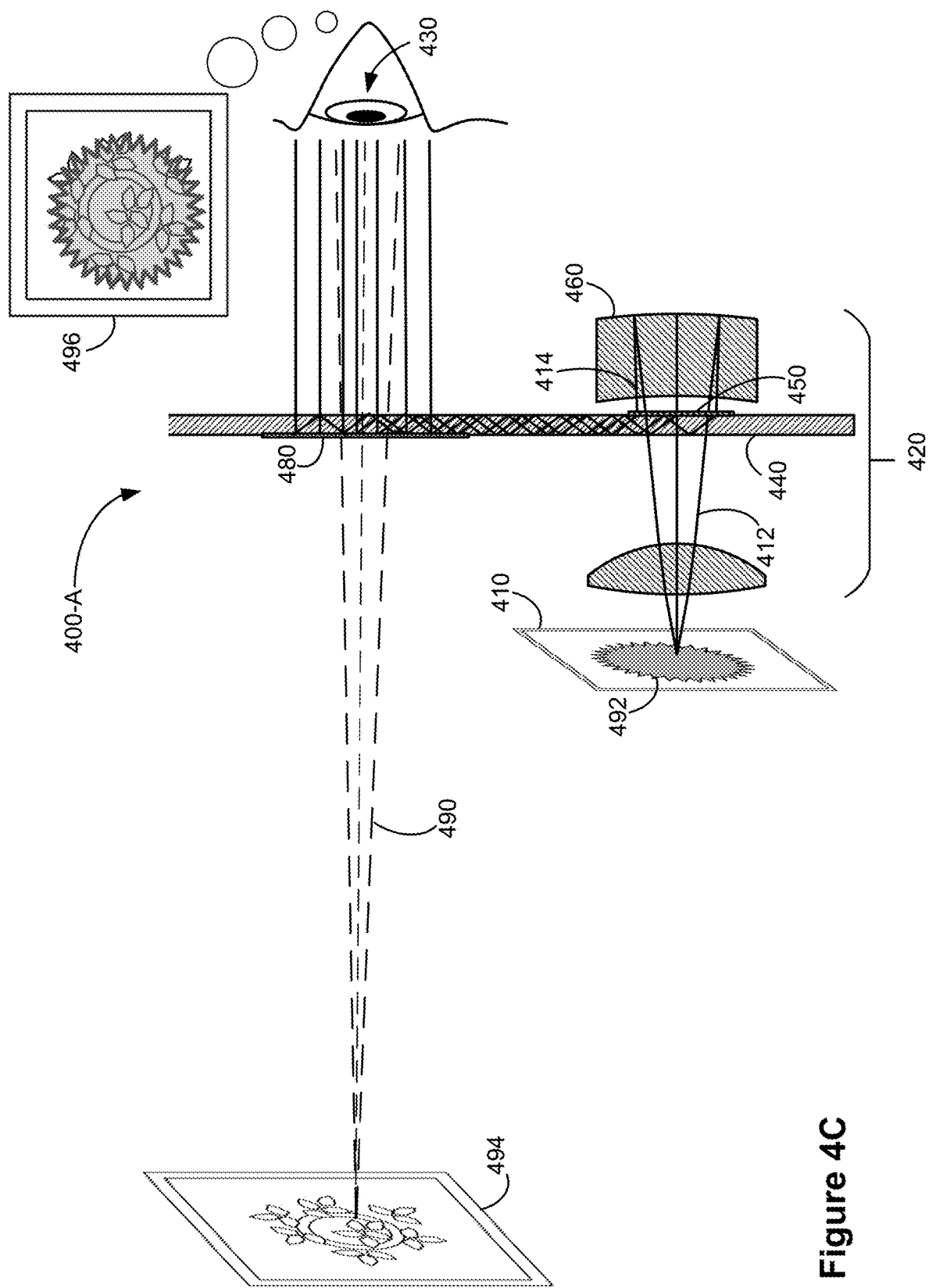
FIG. 4C is a schematic diagram illustrating the display device of FIG. 4A in an augmented reality application, in accordance with some embodiments.

FIG. 4C is a schematic diagram illustrating the display device 400-A in an augmented reality application, in accordance with some embodiments. As shown on FIG. 4C, the image light 412 output by the display 410 corresponds to one or more images (e.g., image 492). As described above with respect to FIG. 4A, the optical assembly 420 is configured to project the image light 412 output by the display 410 toward the eye 430 of the user of the display device 400-A. The first optical waveguide 440 is further configured as an optical combiner to transmit light from outside the display device 400-A, e.g., light 490 from an object 494 positioned outside the display device 400-A. In FIG. 4C, the object 494 is illustrated as a framed picture that the user of the display device 400-A is looking at. The image light output from the first optical waveguide 440 is combined, or overlapped, with the light 490 from the object 494 to form a combined image 496 in the user's eye 430. As a result, the user's perception of object 494 is augmented by the image 492 output by the display 410, as shown in FIG. 4C.

As shown in FIG. 4C, the one or more output couplers 480 are configured expand etendue of the light 412 in the optical assembly 420. An original input pupil area of light 412 is increased by replication due to multiple interactions with the one or more output couplers 480.

Figure 4D:
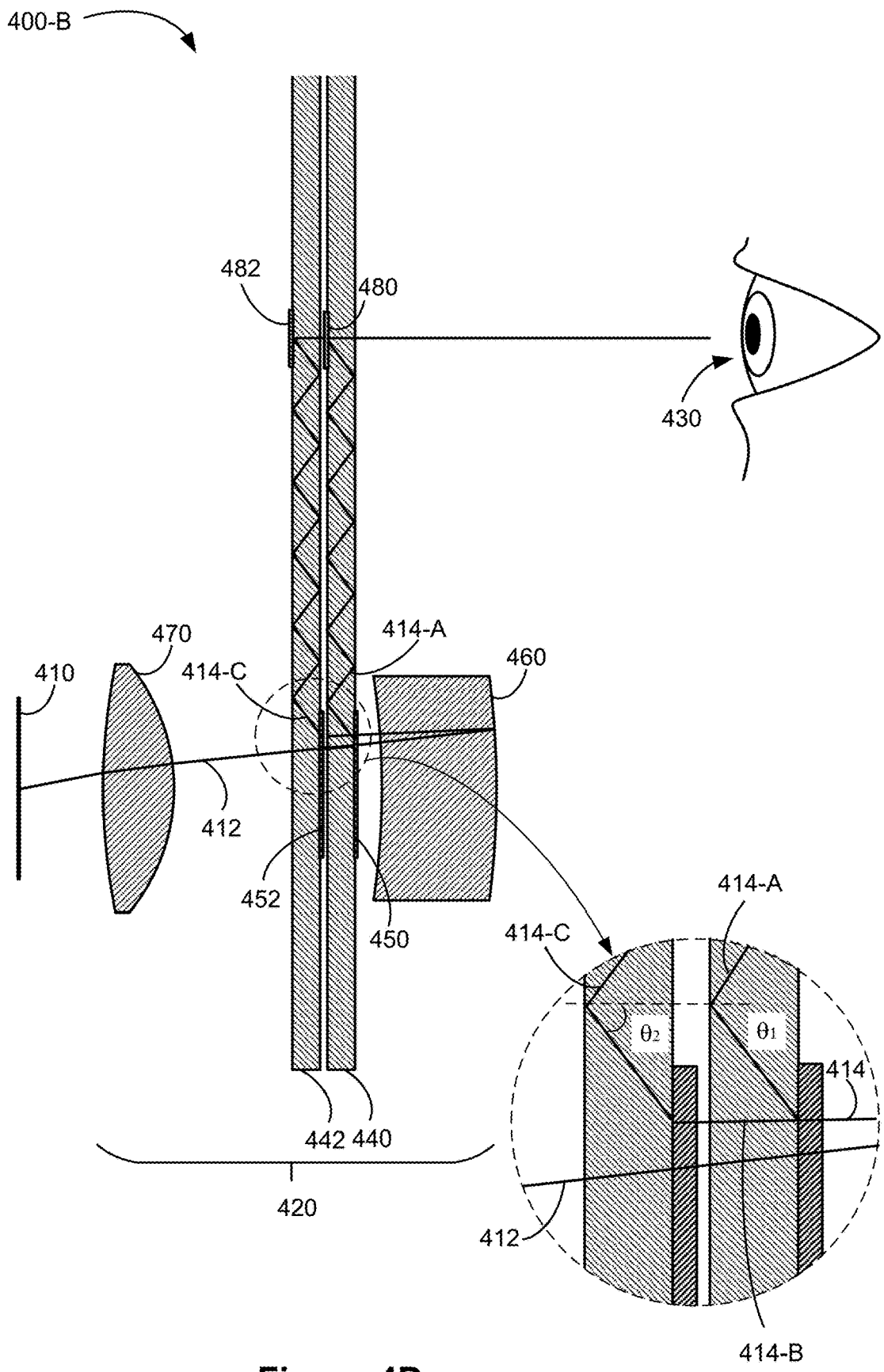
FIG. 4D is a schematic diagram illustrating a display device in accordance with some embodiments.

FIG. 4D is a schematic diagram illustrating display device 400-B in accordance with some embodiments. The display device 400-B corresponds to the display device 400-A described above with respect to FIG. 4A, except that optical assembly 420 in the display device 400-B further includes a second optical waveguide 442 and a second in-coupler 452 coupled with the second optical waveguide 442. The second optical waveguide 442 is positioned parallel to the first optical waveguide 440. In some embodiments, the second in-coupler 452 is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material. In some embodiments, the second in-coupler 452 is a PVG (e.g., a polarization volume grating 700 described below with respect to FIGS. 7A-7D), and is selective with respect to polarization, incident angle, and/or wavelength range, of light incident thereon. The second in-coupler 452 and at least a portion of the second optical waveguide 442 are disposed between the display 410 and the reflective optical element 460.

As shown in FIG. 4D, in addition to being polarization selective, the first in-coupler 450 is also wavelength selective. In some embodiments, the first portion 414-A of the second light 414 redirected by the first in-coupler 450 is in a first wavelength range. Thus, the first in-coupler 450 is further configured to transmit a second portion 414-B of the second light 414 having a second wavelength range distinct from the first wavelength range while redirecting the first portion 414-A of the second light 414. The second in-coupler 452 is configured to, similar to the first in-coupler 450, to receive and transmit the first light 412 having the first polarization. The second in-coupler 452 is further configured to receive the second portion 414-B of the second light 414 having the second polarization and the second wavelength range, and to redirect at least a portion of the second portion 414-B of the second light 414, i.e., a third portion 414-C of the second light 414, so that third portion 414-C impinges on a surface of the second optical waveguide 442 at an incident angle $\theta_2$ that is above a critical angle associated with the second optical waveguide 442. Thus, third portion 414-C would undergo total internal reflection inside the second optical waveguide 442 and continue to propagate through the waveguide via a series of total reflection events. In some embodiments, the incident angle $\theta_2$ is distinct from the incident angle $\theta_1$.

In some embodiments, the first wavelength range and the second wavelength range correspond to distinct colors or ranges of colors. For example, the first wavelength range corresponds to red light (e.g., the first wavelength range is from 635 nm through 700 nm corresponding to red color) and the second wavelength range corresponds to green light (e.g., the first wavelength range is from 520 nm through 560 nm corresponding to green color). In some embodiments, the first wavelength range corresponds to a first portion of a first color and a first portion of a second color and the second wavelength range corresponds to a second portion of the first color and a second portion of the second color. For example, the first wavelength range corresponds to a first portion of red light and a first portion of green (e.g., the first wavelength range is from 635 nm through 650 nm and from 520 nm through 540 nm) and the second wavelength range corresponds to a second portion of red light and a second portion of green (e.g., the first wavelength range is from 650 nm through 700 nm and from 540 nm through 560 nm). In some embodiments, the wavelength ranges are a combination of three colors, such as red, green and blue (e.g., a blue color ranging from 450 nm through 490 nm).

Figure 4E:
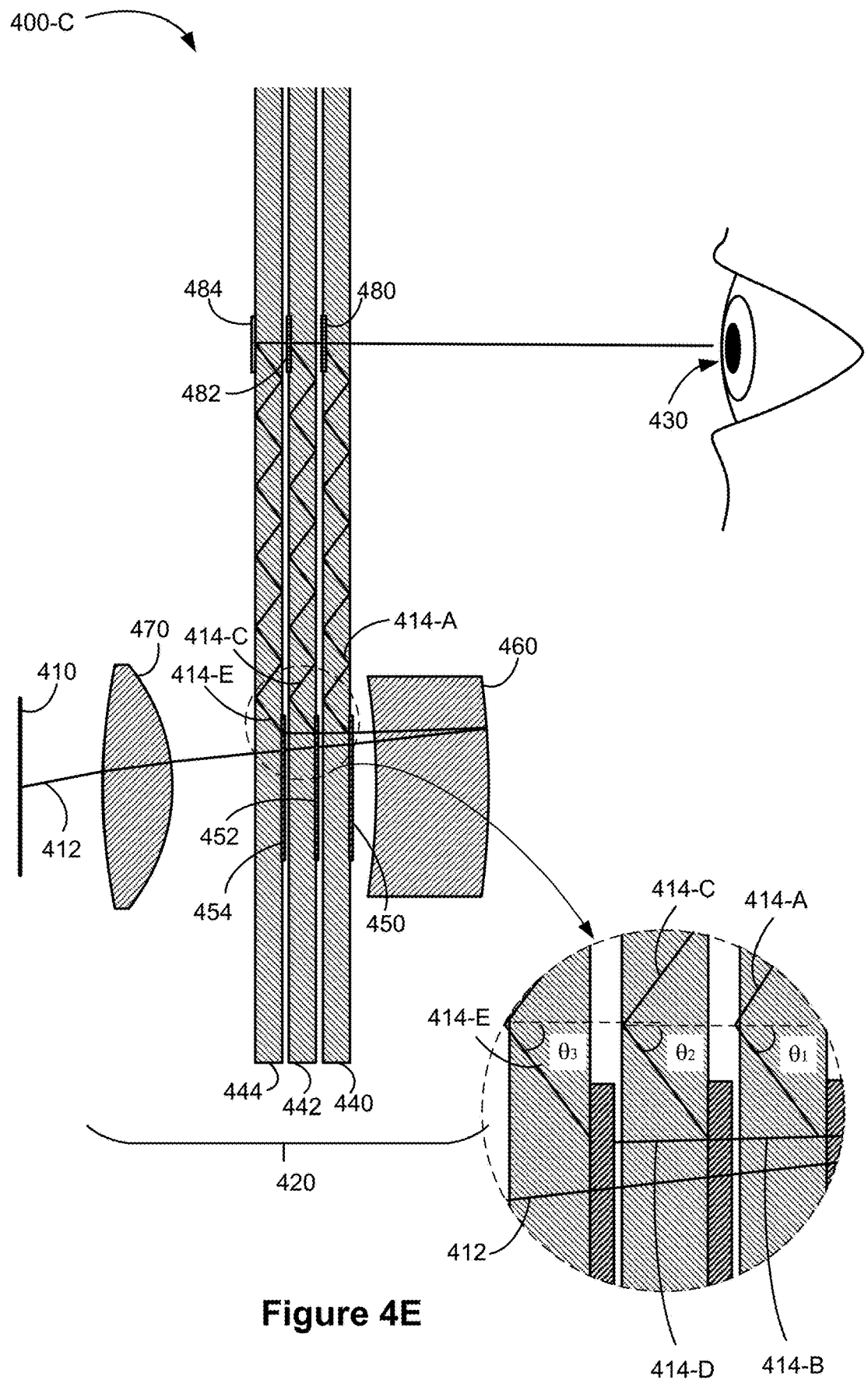
FIG. 4E is a schematic diagram illustrating a display device in accordance with some embodiments.
Figure 4F:
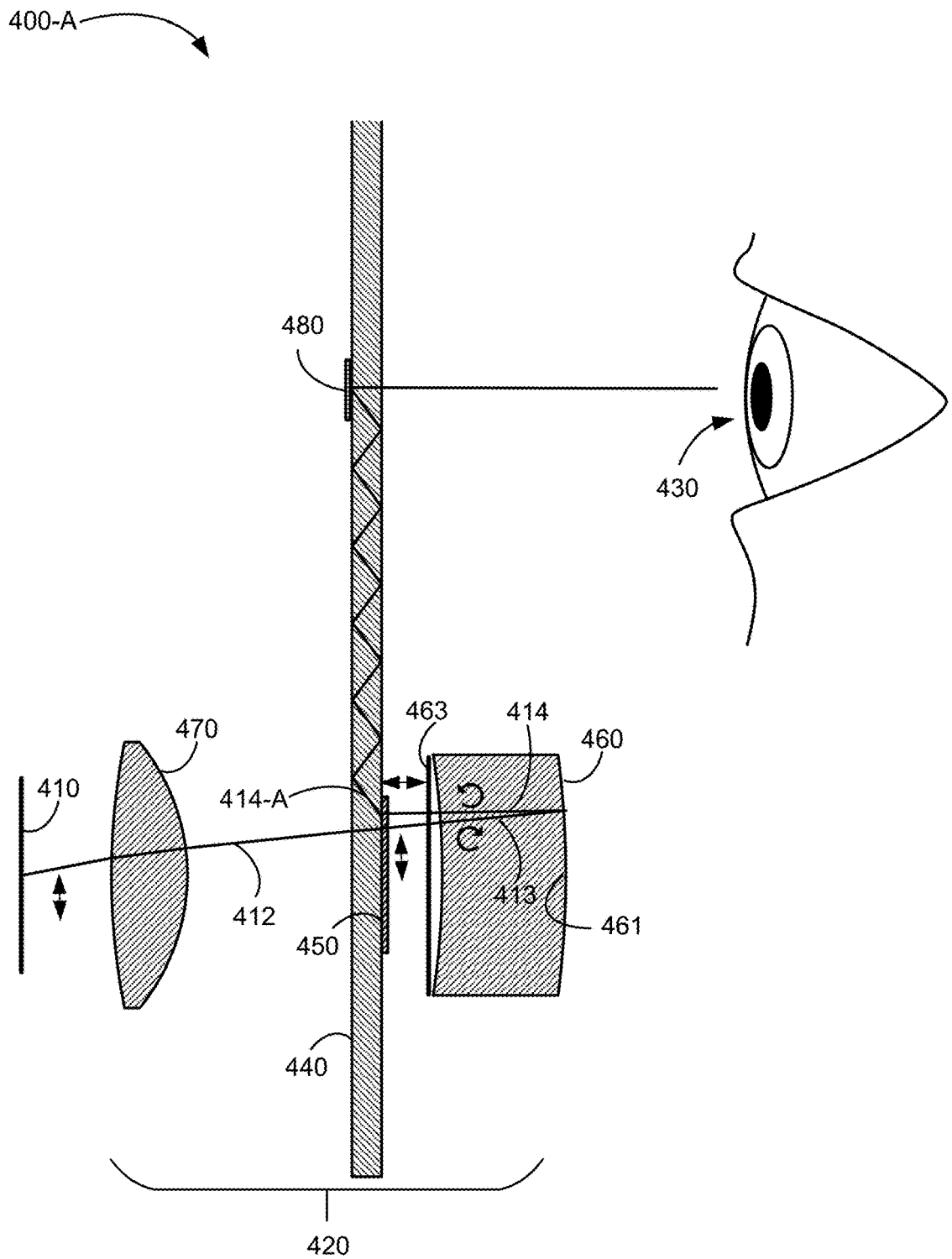
FIG. 4F is a schematic diagram illustrating a display device in accordance with some embodiments.

FIG. 4E is a schematic diagram illustrating display device 400-C in accordance with some embodiments. The display device 400-C corresponds to the display device 400-B described above with respect to FIG. 4D, except that an optical assembly 420 of the display device 400-C includes a third optical waveguide 444 and a third in-coupler 454 coupled with the third optical waveguide 444. The third optical waveguide 444 is positioned parallel to the first optical waveguide 442 and the second optical waveguide 442. In some embodiments, the third in-coupler 454 is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material. In some embodiments, the third in-coupler 454 is a PVG (e.g., a polarization volume grating 700 described below with respect to FIGS. 7A-7D), and is selective with respect to polarization, incident angle, and/or wavelength range, of light incident thereon. The third in-coupler 454 and at least a portion of the third optical waveguide 444 are disposed between the display 410 and the reflective optical element 460.

As shown in FIG. 4E, in addition to being polarization selective, the second in-coupler 452 is also wavelength selective. In some embodiments, the first portion 414-A of the second light 414 redirected by the first in-coupler 450 is in the first wavelength range and the third portion 414-C of the second light 414 redirected by the second in-coupler 452 in in the second wavelength range. Thus, the first in-coupler 450 and the second in-coupler 452 are configured to transmit a fourth portion 414-D, which is a portion of the second portion 414-B of the second light 414, having a third wavelength range while respectively redirecting the first portion 414-A and the third portion 414-C of the second light 414. The third in-coupler 454 is configured to, similar to the first in-coupler 450 and the second in-coupler 452, to receive and transmit the first light 412 having the first polarization. The third in-coupler 454 is further configured to receive the fourth portion 414-D of the second light 414 having the second polarization and the third wavelength range, and to redirect at least a portion of the fourth portion 414-D of the second light 414, i.e., a fifth portion 414-E of the second light 414, so that the fourth portion 414-D impinges on a surface of the third optical waveguide 444 at an incident angle $\theta_3$ that is above a critical angle associated with the third optical waveguide 444. Thus, the fifth portion 414-E of the second light 414 would undergo total internal reflection inside the third optical waveguide 444 and continue to propagate through the waveguide via a series of total reflection events. In some embodiments, the incident angle $\theta_3$ is distinct from the incident angle $\theta_1$ and/or the incident angle $\theta_2$.

In some embodiments, the first wavelength range, the second wavelength range, and the third wavelength range correspond to distinct colors or ranges of colors. For example, the first wavelength range corresponds to red light, the second wavelength range corresponds to green light, and the third wavelength range corresponds to blue light. In some embodiments, the first wavelength range corresponds to a first portion of a first color, a first portion of a second color, and a first portion of a third color, the second wavelength range corresponds to a second portion of the first color, a second portion of the second color and a third portion of the third color. For example, the first wavelength range corresponds to a first portion of red light, a first portion of green and a first portion of blue (e.g., the first wavelength range is from 635 nm through 650 nm, from 520 nm through 540 nm and from 450 nm through 470 nm), the second wavelength range corresponds to a second portion of red light, a second portion of green light and a second portion of blue light (e.g., the first wavelength range is from 650 nm through 670 nm, from 540 nm through 550 nm, and from 470 nm through 480 nm), and the third wavelength range corresponds to a third portion of red light, a third portion of green light, and a third portion of blue light (e.g., the first wavelength range is from 670 nm through 700 nm, from 550 nm through 560 nm, and from 480 nm through 490 nm).

Figure 5A:
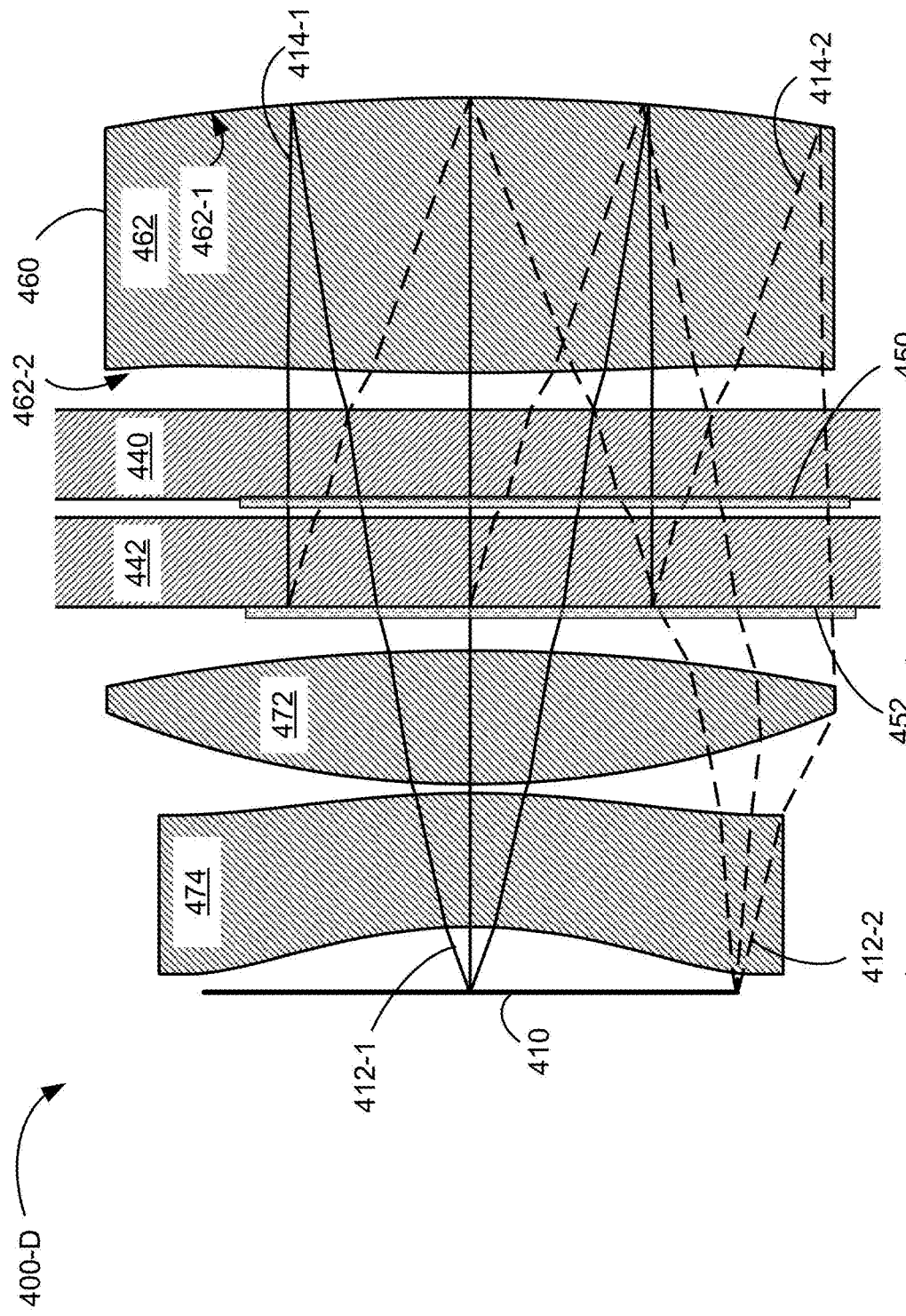
FIG. 5A is a schematic diagram illustrating a display device in accordance with some embodiments.

FIG. 5A is a schematic diagram illustrating a display device 400-D in accordance with some embodiments. The display device 400-D corresponds to the display device 400-B described above with respect to FIG. 4D, except that the one or more lenses 470 is shown to include a first lens 422 and a second lens 424. The first lens 422 and the second lens 424 are disposed between the display 410 and the first optical waveguide 440. The first lens 422 is configured to focus the first light 412 output by the display 410. In some embodiments, the first lens 422 is a double-convex lens, as shown in FIG. 5A. In some embodiments, the second lens 424 is configured to reduce aberrations in an image formed by the first light 412 output by the display 410. In some embodiments, the second lens 424 is a meniscus lens, as shown in FIG. 5A.

In some embodiments, the reflective optical element 460 includes a negative meniscus lens 462 coupled with a reflective surface 462-1 as shown in FIG. 5A (e.g., the reflective optical element 460 is a Mangin mirror). In some embodiment, the reflective optical element 460 includes spherical or aspherical surfaces, or a combination thereof. As shown in FIG. 5A, the negative meniscus lens 462 has an aspherical surface (e.g., surface 462-1) and a spherical surface (e.g., the reflective surface 462-2 has a spherical shape). The reflective optical element 460 is configured to reflect, and focus, the first light 412 as the second light 414 so that the second light 414 is more collimated that the first light 412. As shown in FIG. 5A, the first light 412, including rays 412-1 and 412-2, is reflected, and focused, by the reflective optical element 460 as the second light 414 including rays 414-1 and 414-2, which are collimated.

The properties (e.g., sizes, thicknesses, shapes, focal lengths, etc.) of the lenses, including the first lens 422, the second lens 424 and the negative meniscus lens 462, are optimized to achieve desired optical properties. In some embodiments, such lenses include spherical, aspherical, plano, and/or freeform lens surfaces, or any combination thereof.

Figure 5B:
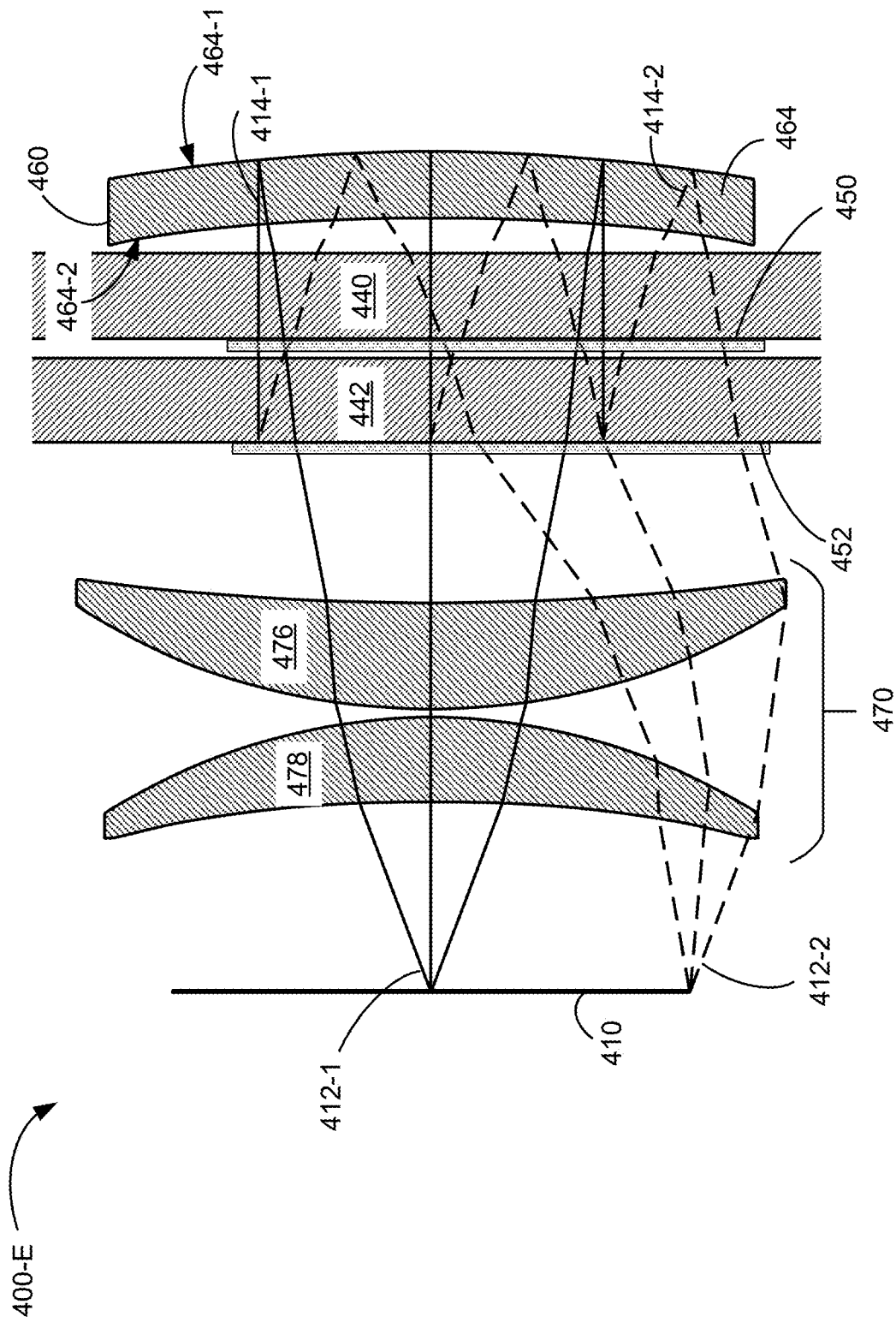
FIG. 5B is a schematic diagram illustrating a display device in accordance with some embodiments.

FIG. 5B is a schematic diagram illustrating display device 400-E in accordance with some embodiments. The display device 400-E corresponds to the display device 400-B described above with respect to FIG. 4D, except that the one or more lenses 470 include a third lens 426 and a fourth lens 428. The third lens 426 and the fourth lens 428 are both meniscus lenses and the combination of the third lens 426 and the fourth lens 428 is configured to focus the first light 412, including rays 412-1 and 412-2, output by the display 410 and to reduce aberrations in an image formed by the first light 412.

Another difference between display device 400-E and display device 400-B described above with respect to FIG. 4D is that the reflective optical element 460 of FIG. 5B includes is a negative meniscus lens 464 coupled with a reflective surface 464-1. The negative meniscus lens 464 has two spherical surfaces, including surface 464-1 and a reflective surface 464-1, which has a spherical shape. As explained above, the reflective optical element 460 is configured to reflect, and focus, the first light 412, including rays 412-1 and 412-2, as the second light 414, including rays 414-1 and 414-2, so that the second light 414 is more collimated that the first light 412. As shown in FIG. 5B, rays 414-1 and 414-2 are collimated.

Figure 5C:
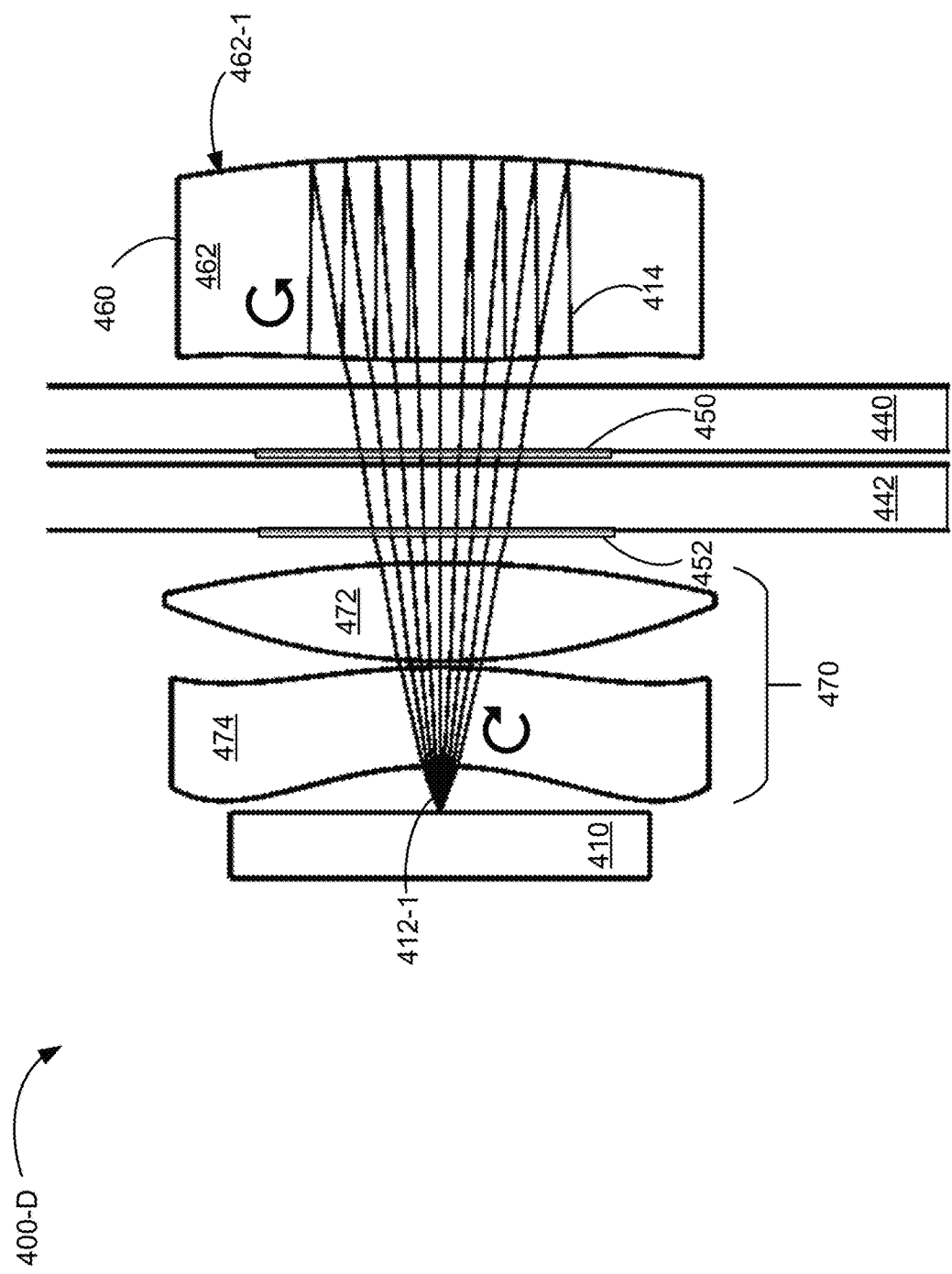
FIGS. 5C-5D are schematic diagrams illustrating the display device of FIG. 5A in accordance with some embodiments.
Figure 5D:
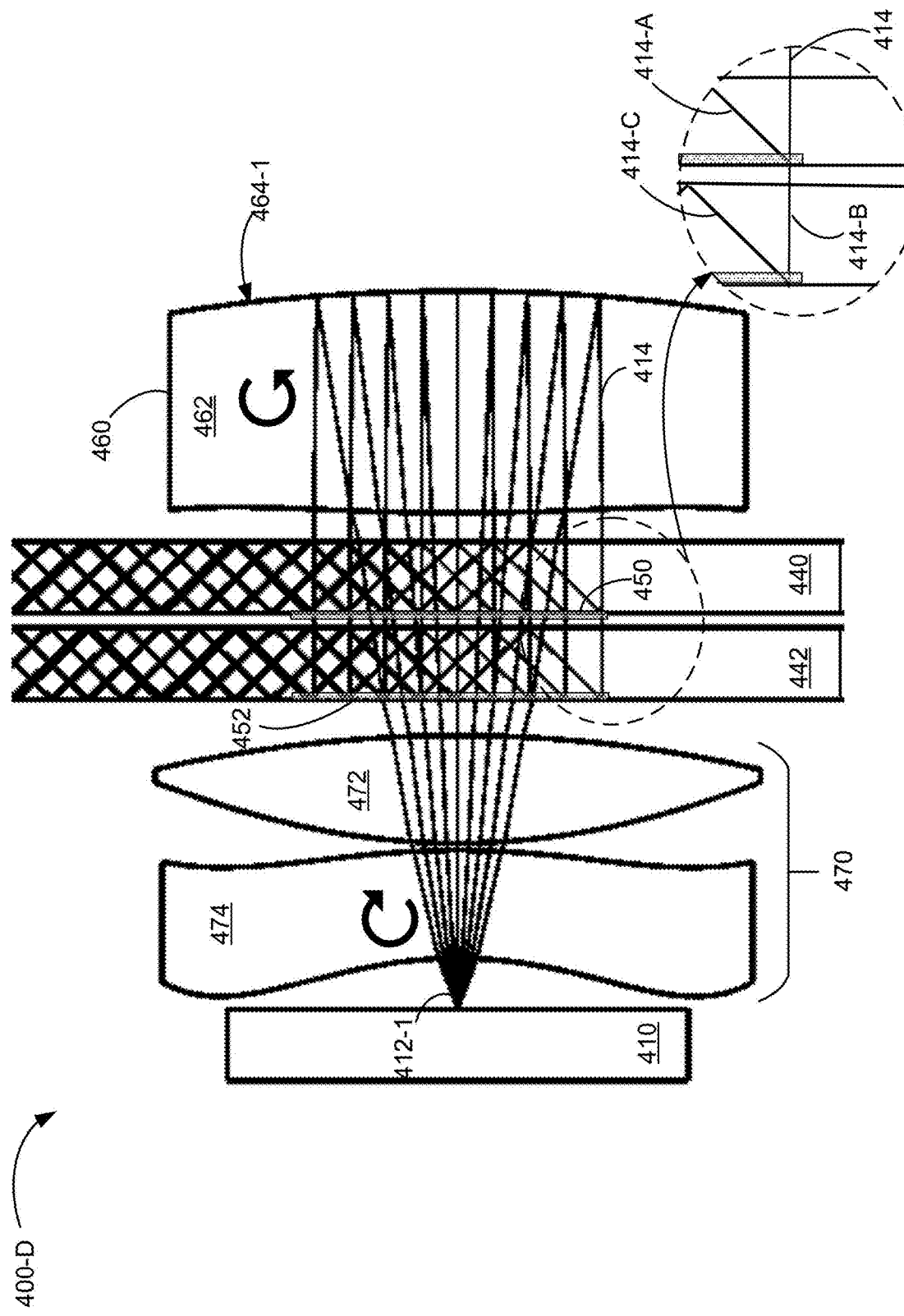
Figure 5E:
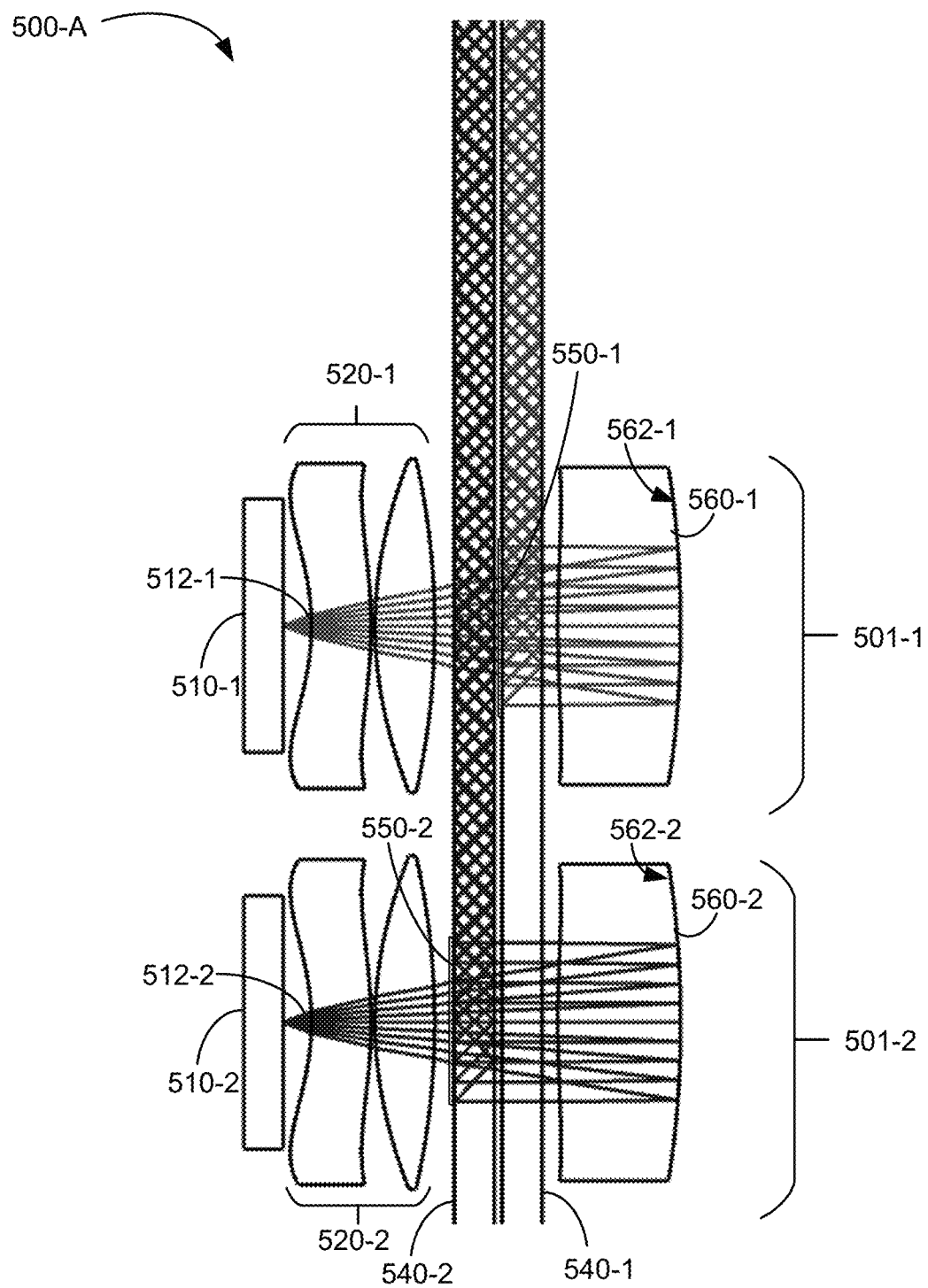
FIG. 5E is a schematic diagram illustrating a display device in accordance with some embodiments.
Figure 5F:
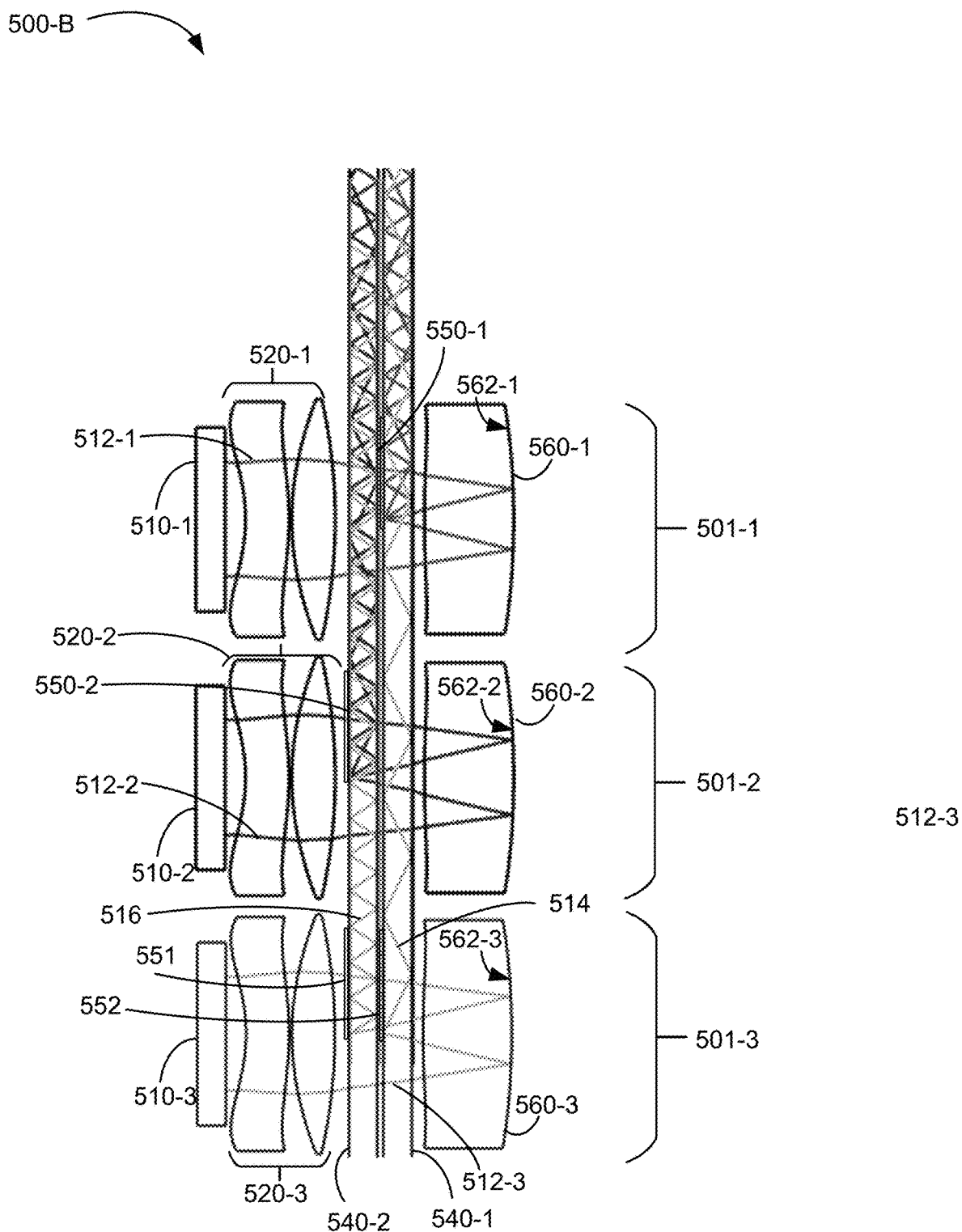
FIG. 5F is a schematic diagram illustrating a display device in accordance with some embodiments.

FIGS. 5C-5D are schematic diagrams illustrating the display device 400-D in accordance with some embodiments. FIG. 5C shows the first light 412 (e.g., rays 412-1) output by the display 410 being reflected by reflective surface 462-1. The first light 412 has the first circular polarization. The first light 412 includes rays 412-1 that diverge as they propagate from the display 410 to the reflective optical element 460. As shown, the first light 412 is transmitted through, and focused by, the second lens 474 and the first lens 472, such that the divergence of the first light 412 is reduced. The first light 412 is transmitted through the first optical waveguide 440 coupled with the first in-coupler 450 and the second optical waveguide 442 coupled with the second in-coupler 452. The first light 412 is then received by the reflective optical element 460. The first light 412 is reflected off the reflective surface 462-1 of the reflective optical element 460 as the second light 414 having the second circular polarization. In some embodiments, the second light 414 reflected off the reflective surface 462-1 is substantially collimated. FIG. 5D shows the second light 414 propagating toward the first optical waveguide 440. The first portion 414-A having the first wavelength range is redirected by first in-coupler 450, and the second portion 414-B having the second wavelength range is redirected by second in-coupler 452. In some embodiments, the first portion 414-A of the second light 414 is reflected off the first in-coupler 450 so that the portion 414-A of the second light 414 propagates through a portion of the first optical waveguide 440 by total internal reflection (as shown in the inset of FIG. 5D). The second portion 414-B of the second light 414 is transmitted through the first in-coupler and the second optical waveguide 442. The second portion 414-B of the second light 414 is then reflected off the second in-coupler 452 so that the third portion 414-C of the second light 414 propagates through a portion of the second optical waveguide 442 by total internal reflection. FIGS. 5E and 5F are schematic diagrams illustrating display devices including two or more displays. In some embodiments, such multi-display devices may provide an increased field of view having individual projectors providing image light for distinct portions of a field of view of an eye of a user. In some embodiments, such multi-display devices may provide an increase field of view (e.g., a first display providing light to a smaller area of the field of view with higher resolution and a second display simultaneously providing light to a larger area of the field of view with a lower resolution). In some embodiments, the multi-display devices include multiple displays outputting light of different colors (e.g., a first display outputting mostly red colored light, a second display outputting mostly blue colored light and a third display outputting mostly green colored light).

FIG. 5E is a schematic diagram illustrating a display device 500-A in accordance with some embodiments. As shown in FIG. 5E, display device 500-A includes a plurality of display assemblies (e.g., display assemblies 501-1, 501-2) corresponding to respective ones of a plurality of wavelength ranges (e.g., the first wavelength range, the second wavelength range), and a plurality of optical waveguides (e.g., waveguides 540-1, 540-2) corresponding to respective ones of the plurality of display assemblies. In some embodiments, a respective display assembly of the plurality of display assemblies in display device 500-A includes a respective display configured to output image light in a respective wavelength range, a respective lens assembly configured to focus the image light output from the respective display, a respective reflective optical element having a respective reflective surface, and a respective in-coupler configured to redirect the image light in the respective wavelength range so that the image light in the respective wavelength range propagates through a portion of the respective optical waveguide by total internal reflection.

For example, display assembly 501-1 includes a display 510-1 configured to output image light 512-1 in the first wavelength range, a lens assembly 520-1 configured to focus the image light 512-1 output from display 510-1, a reflective optical element 560-1 having a reflective surface 562-1, and an in-coupler 550-1 configured to redirect the image light 512-1 reflected off the reflective surface 562-1 so that the image light 512-1 in the first wavelength range propagates through a portion of optical waveguide 540-1 by total internal reflection. Likewise, display assembly 501-2 includes a display 510-2 configured to output image light 512-2 in the second wavelength range, a lens assembly 520-2 configured to focus the image light 512-2 output from display 510-2, a reflective optical element 560-2 having a reflective surface 562-2, and an in-coupler 550-2 configured to redirect the image light 512-2 reflected off the reflective surface 562-2 so that the image light 512-2 in the second wavelength range propagates through a portion of optical waveguide 540-2 by total internal reflection.

FIG. 5F is a schematic diagram illustrating a display device 500-B in accordance with some embodiments. As shown in FIG. 5F, display device 500-B includes a plurality of display assemblies (e.g., display assemblies 500-1, 500-2, 500-3) corresponding to respective ones of a plurality of wavelength ranges (e.g., the first wavelength range, the second wavelength range, third wavelength range), and a plurality of optical waveguides (e.g., waveguides 540-1, 540-2). In some embodiments, a respective display assembly of the plurality of display assemblies in display device 500-B includes a respective display configured to output image light in a respective wavelength range, a respective lens assembly configured to focus the image light output from the respective display, a respective reflective optical element having a respective reflective surface, and at least one respective in-coupler configured to redirect the image light in the respective wavelength range so that the image light in the respective wavelength range propagates through a portion of at least one of the plurality of optical waveguides by total internal reflection.

For example, display assembly 501-1 includes display 510-1 configured to output image light 512-1 in the first wavelength range, lens assembly 520-1 configured to focus the image light 512-1 output from display 510-1, reflective optical element 560-1 having reflective surface 562-1, and in-coupler 550-1 configured to redirect the image light 512-1 reflected off the reflective surface 562-1 so that the image light 512-1 in the first wavelength range propagates through a portion of optical waveguide 540-1 by total internal reflection. Likewise, display assembly 501-2 includes display 510-2 configured to output image light 512-2 in the second wavelength range, lens assembly 520-2 configured to focus the image light 512-2 output from display 510-2, reflective optical element 560-2 having reflective surface 562-2, and in-coupler 550-2 configured to redirect the image light 512-2 reflected off the reflective surface 562-2 so that the image light 512-2 in the second wavelength range propagates through a portion of optical waveguide 540-2 by total internal reflection.

In addition, the display assembly 501-3 includes a display 510-3 configured to output image light 512-3 in the third wavelength range, a lens assembly 520-3 configured to focus the image light 512-3 output from display 510-3, a reflective optical element 560-3 having a reflective surface 562-3, a first in-coupler 551 configured to redirect a first portion 514 of the image light reflected off the reflective surface 562-3 so that the first portion 514 of the image light in the third wavelength range propagates through a portion of optical waveguide 540-1 by total internal reflection, and a second in-coupler 552 configured to redirect a second portion 516 of the image light reflected off the reflective surface 562-3 so that the second portion 516 of the image light in the third wavelength range propagates through a portion of optical waveguide 540-2 by total internal reflection. In some embodiments, the first portion 514 of the image light is incident upon first in-coupler 551 with incident angles in a first incident angle range, and the second portion 514 of the image light is incident upon second in-coupler 552 with incident angles in a second incident angle range.

Figure 5H:
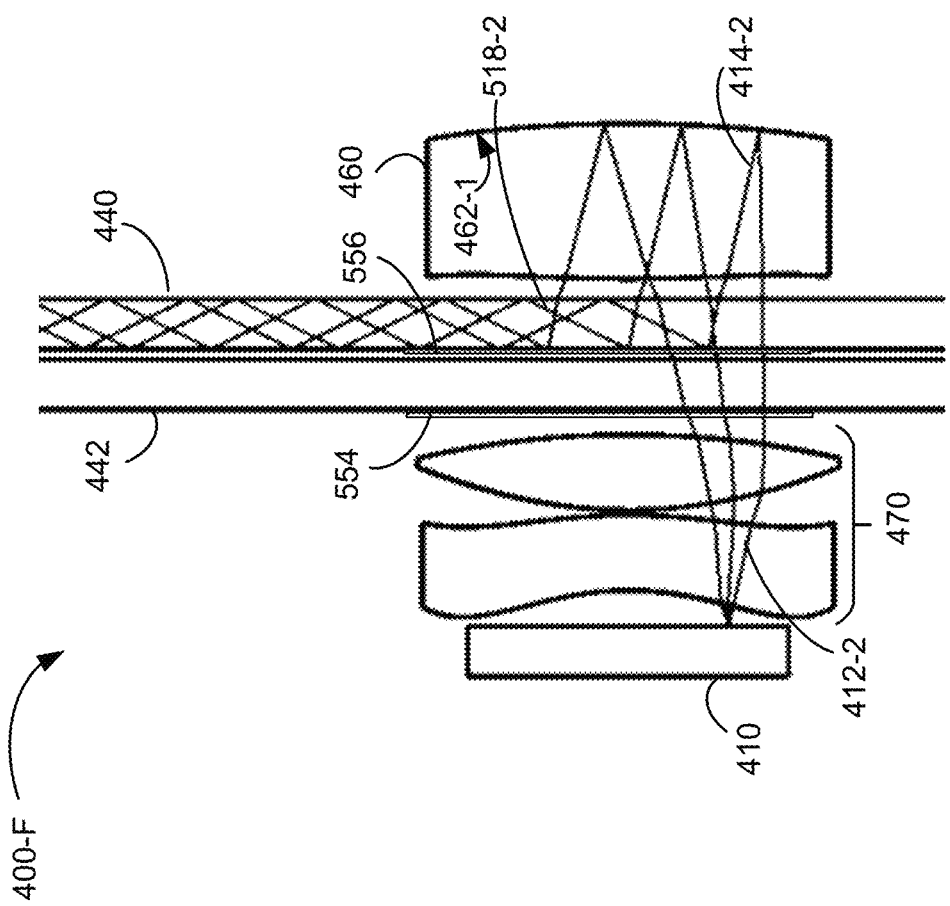
FIGS. 5G-5H are schematic diagrams illustrating a display device in accordance with some embodiments.
Figure 5G:
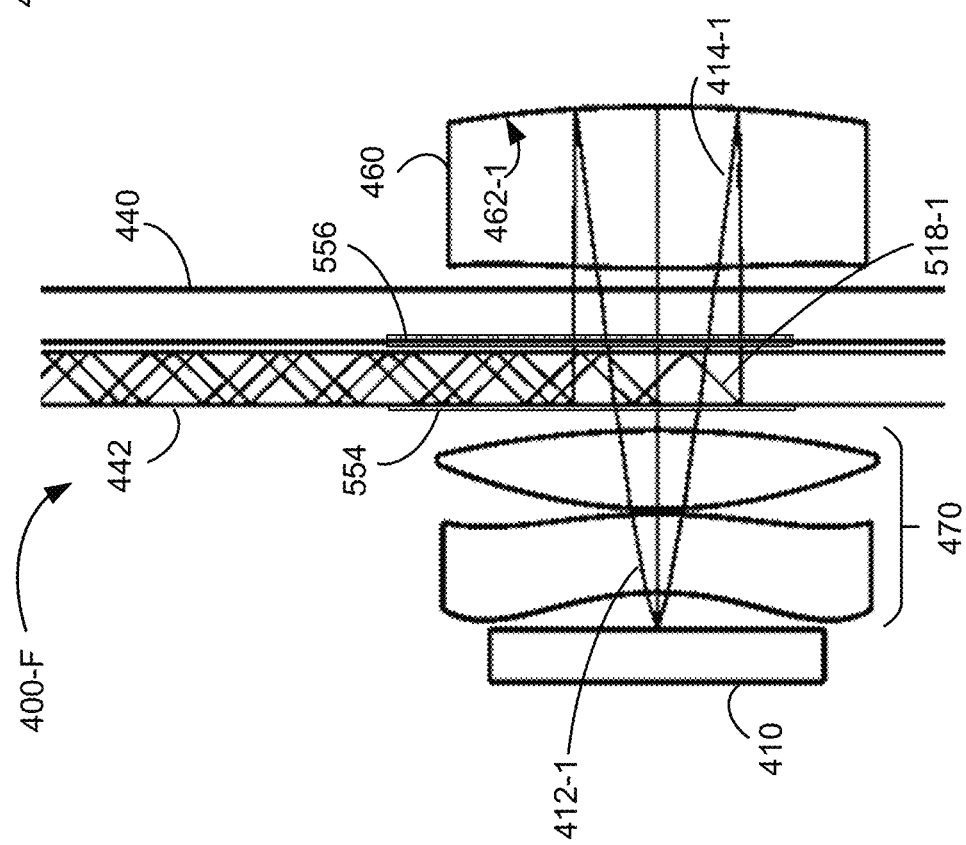

FIGS. 5G and 5H are schematic diagrams illustrating a display device 400-F in accordance with some embodiments. The display device 400-F corresponds to the display device 400-D described above with respect to FIG. 5A, except that the display device 400-F includes a first in-coupler 554 and a second in-coupler 556. The first in-coupler 554 is configured to redirect light incident upon the first in-coupler 554 with incident angles in a first incident angle range and the second in-coupler 556 is configured to redirect light incident upon the second in-coupler 556 with incident angles in a second incident angle range. The second in-coupler 556 is further configured to transmit the light incident upon the second in-coupler 556 with incident angles in the first incident angle range without redirecting it. For example, first light 412-1 output from a first position on the display 410 is reflected off the reflective surface 462-1 as image light 414-1. The image light 414-1 is substantially collimated and incident upon the first in-coupler 554 and the second in-coupler 556 with an incident angle in the first incident angle range. As shown in FIG. 5G, the second in-coupler 556 is configured to transmit the image light 414-1 and the first in-coupler 554 is configured to redirect a portion 518-1 of image light 414-1 so that the portion 518-1 of the image light 414-1 propagates through a portion of optical waveguide 442 by total internal reflection. Second light 412-2 output from a second position on the display 410 is reflected off the reflective surface 462-1 as image light 414-2. The image light 414-2 is substantially collimated and is incident upon the second in-coupler 556 with an incident angle in the second incident angle range. The second in-coupler 556 is configured to redirect a portion 518-2 of image light 414-2 so that the portion 518-2 of the image light 414-2 propagates through a portion of optical waveguide 440 by total internal reflection.

Figure 6A:
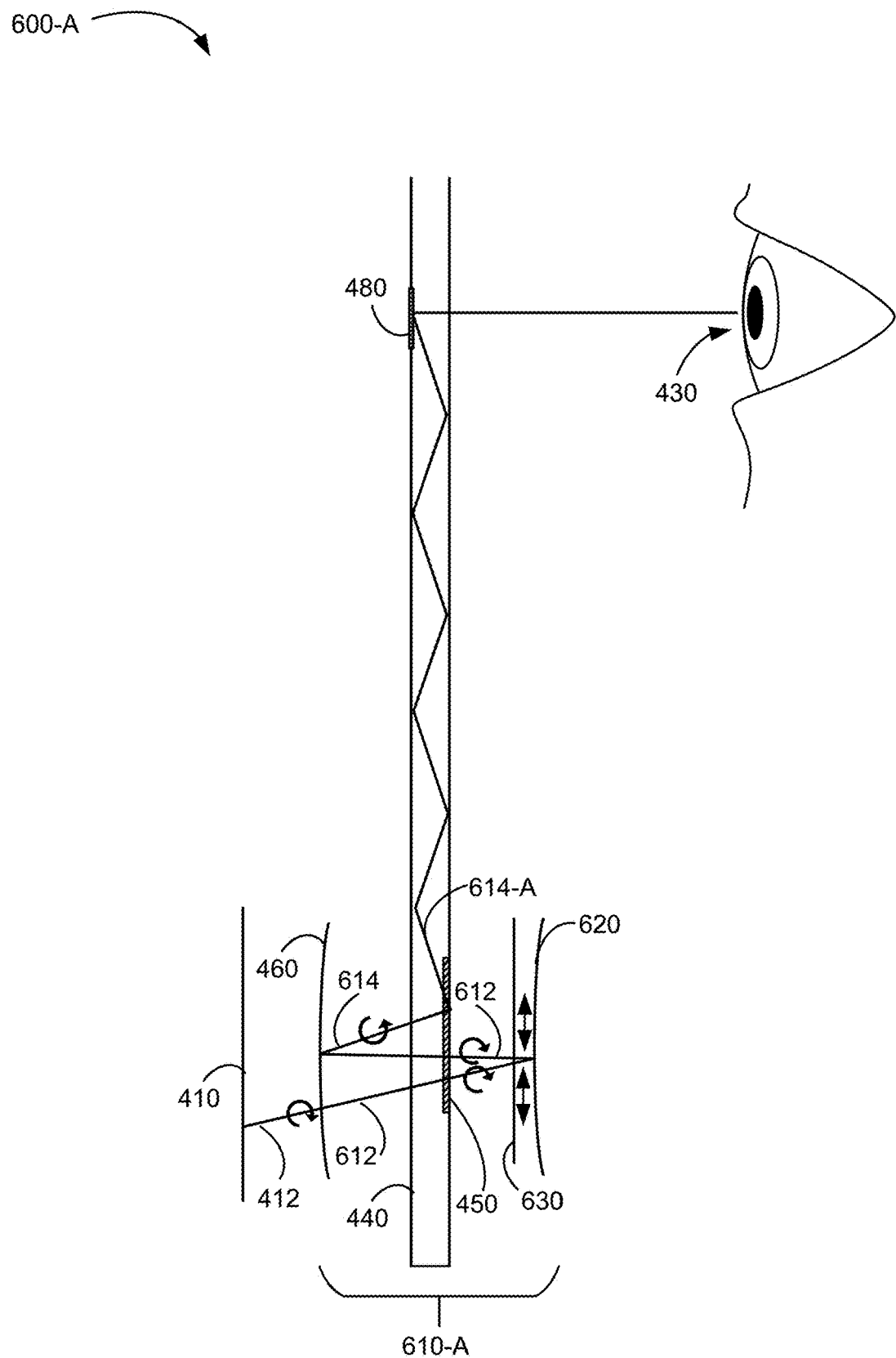
FIG. 6A is a schematic diagram illustrating a display device in accordance with some embodiments.
Figure 6B:
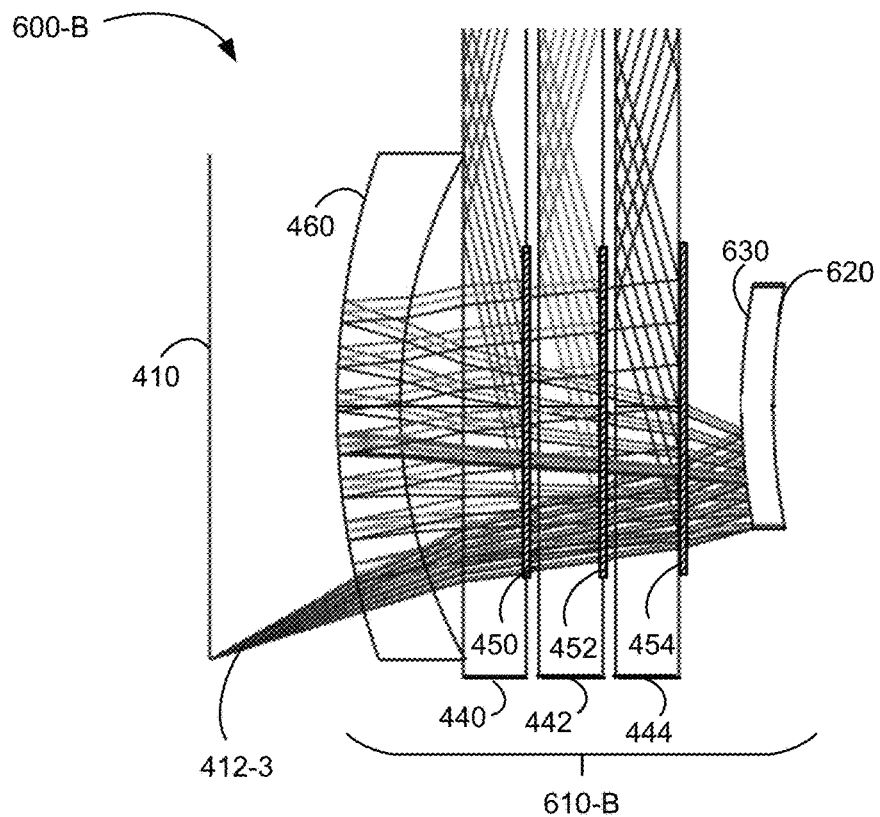
FIGS. 6B-6C are schematic diagrams illustrating a display in accordance with some embodiments.
Figure 6C:
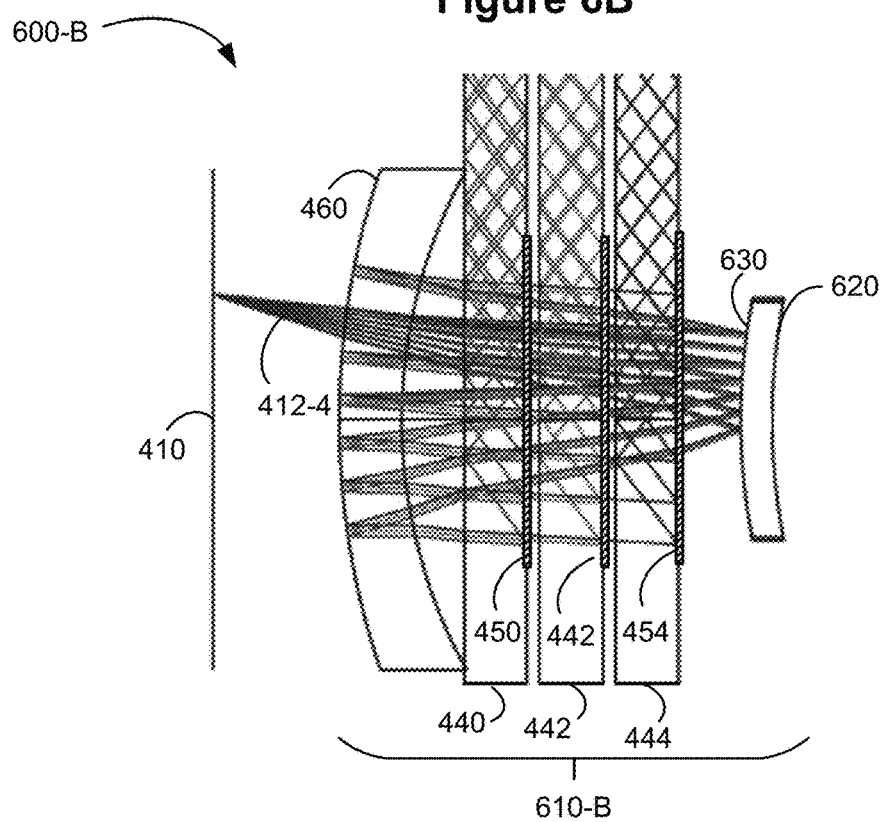

FIG. 6A is a schematic diagram illustrating a display device 600-A in accordance with some embodiments. The display device 600-A corresponds to the display device 400-A described above with respect to FIG. 4A and includes an optical assembly 610-A corresponding to optical assembly 420, except that optical assembly 610-A of the display device 600-A further includes a quarter wave plate (QWP) 630 and a reflector 620. Additionally, in the display device 600-A, the reflective element 460 is positioned between the display 410 and the first optical waveguide 440. The reflective optical element 460 is configured to receive the first light 412 output from the display 410. The reflective optical element 460 is then configured to transmit a portion of the first light, marked here as first light 612, without changing its polarization or direction. For example, the reflective optical element 460 is a partial reflector, such as a 50/50 mirror configured to transmit 50% of light while reflecting 50% of the light. The first light 612 having the first circular polarization is transmitted through the first waveguide 440 and the first in-coupler 450 toward the reflector 620. As shown, the reflector 620 is optically coupled with the QWP 630. In some embodiment, the reflector 620 is coupled, or attached, to the QWP 630, as is shown in FIGS. 6B-6C. A QWP is an is an optical retarder (e.g., a quarter-wave plate) configured to change circular polarized light to linearly polarized light, and vice versa, while transmitting the light. The QWP 630 is configured to change the circularly polarized light 612 to a linearly polarized light. The reflective optical element 460 is configured to receive the light 612 having the linear polarization and reflect the light without changing its polarization. The QWP 630 is further configured to receive the light 612 having the linear polarization and change the polarization from the linear polarization back to the first circular polarization. The light 612 having the first circular polarization is then transmitted again through the first optical waveguide 440 and the first in-coupler 450. The reflective optical element 460 is configured to receive the light 612 from the first optical waveguide 440 and reflect a portion of the light 612 as light 614 having the second circular polarization. The optical element 450 is configured to receive the light 614 having the second circular polarization and to reflect the light 614 so that the light 614 undergoes total internal reflection inside the first optical waveguide 440, and continues to propagate through the first optical waveguide 440.

FIGS. 6B-6C are schematic diagrams illustrating the display device 600-B in accordance with some embodiments. The display device 600-B corresponds to display device 600-A described with respect to FIG. 6A, except that display device 600-B includes the first optical waveguide 440, the second optical waveguide 442, and the third optical waveguide 444 coupled respectively with the first in-coupler 450, the second in-coupler 452, and the third in-coupler 454. As shown in FIG. 6B, the first light 412-3 is emitted from a first position on the display 410 and in FIG. 6C the first light 412-4 is emitted from a second position on the display 410.

In FIGS. 6B and 6C, the first light 412 includes a first wavelength range illustrated with red, a second wavelength range illustrated with green, and a third wavelength range illustrated with blue. The first in-coupler 450 is configured to reflect the red light, the second in-coupler 452 is configured to reflect the green light, and the third in-coupler 454 is configured to reflect to blue light. FIGS. 6A and 6B illustrate the propagation of the first light 412-3 and 412-4 emitted from distinct positions of the display 410.

FIGS. 7A-7D are schematic diagrams illustrating a polarization volume grating (PVG) 700 in accordance with some embodiments. In some embodiments, PVG corresponds to in-couplers described above with respect to FIGS. 4A, 4D, and 4E (e.g., the first in-coupler 450, the second in-coupler 452, and the third in-coupler 454). In some embodiments, the PVG 700 is a liquid crystal PVG including a layer of liquid crystals arranged in helical structures (e.g., a liquid crystal formed of a cholesteric liquid crystal). A PVG adds or removes optical power based in part on polarization of an incident light. PVG is selective with respect to circular polarization of light. When state (handedness) of the circularly polarized light is along a helical axis of a liquid crystal, the PVG interacts with the circularly polarized light and thereby changes the direction of the light (e.g., reflects, refracts or diffracts the light). Concurrently, while changing the direction of the light, the PVG also changes the polarization of the light. In contrast, the PVG transmits light with opposite circular polarization without changing its direction or polarization. For example, a PVG changes polarization of RCP light to LCP light and simultaneously redirects the light while transmitting LCP light without changing its polarization or direction. In some embodiments, a PVG is also selective on wavelength range and/or on an incident angle. If the incident light is at the designed wavelength, RCP light is redirected and converted to LCP light while RCP light with wavelength outside the designed wavelength range is transmitted without its polarization converted. If the incident light has an incident angle at the designed incident angle range, RCP light is converted to LCP light and redirected while RCP light with an incident angle outside the designed incident angle range is transmitted without its polarization converted.

FIG. 7A illustrates a three dimensional view of PVG 700 with incoming light 704 entering the grating along the z-axis. FIG. 7B illustrates an x-y-plane view of PVG 700 with a plurality of liquid crystals (e.g., liquid crystals 702-1 and 702-2) with various orientations. The orientations of the liquid crystals are constant along reference line between D and D' along the x-axis, as shown in FIG. 7D illustrating a detailed plane view of the liquid crystals along the reference line. As shown in FIG. 7C, a pitch defined as a distance along the y-axis at which an azimuth angle of a liquid crystal has rotated 180 degrees is constant throughout the grating. FIG. 7C illustrates a y-z-cross-sectional view of PVG 700. PVG 700 has helical structures 708 with helical axes aligned corresponding to the y-axis. The helical structures create a volume grating with a plurality of diffraction planes (e.g., planes 710-1 and 710-2). The diffraction planes of PVG 700 extend across the grating. In FIG. 7C, diffraction planes 710-1 and 710-2 are tilted with respect to the z-axis. Helical structures 708 define the polarization selectivity of PVG 700, as light with circular polarization handedness corresponding to the helical axes is diffracted while light with circular polarization with the opposite handedness is not diffracted. Helical structures 708 also define the wavelength selectivity of PVG 700, as light with wavelength close to a helical pitch (e.g., helical pitch 712 in FIG. 7C) is diffracted while light with other wavelengths is not diffracted.

In light of these principles, we now turn to certain embodiments of the present disclosure.

In accordance with some embodiments, an optical assembly (e.g., the optical assembly 420 in FIG. 4A) for projecting light from a display (e.g., display 410) includes a first optical waveguide (e.g., the first optical waveguide 440), a reflective optical element (e.g., the reflective optical element 460), and a first in-coupler (e.g., the first in-coupler 450). The reflective optical element is configured to receive first light (e.g., the first light 412) having a first polarization from the display and to reflect the first light as second light (e.g., the second light 414) having a second polarization distinct from the first polarization. The first in-coupler is coupled with the first optical waveguide. The first in-coupler is configured to receive and transmit the first light. The first in-coupler is further configured to receive the second light and redirect a first portion of the second light (e.g., the first portion 414-A of the second light 414) so that the first portion of the second light undergoes total internal reflection inside the first optical waveguide.

In some embodiments, the first in-coupler is disposed between the display and the reflective optical element (e.g., the first in-coupler 450 is disposed between the display 410 and the reflective optical element 460 in FIG. 4A). The first in-coupler is configured to receive the first light from the display and to transmit the first light toward the reflective element without changing direction or polarization of the first light.

In some embodiments, the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

In some embodiments, the liquid crystal based polarization selective element is a polarization volume grating. (e.g., the first in-coupler 450 is the PVG 700 in FIGS. 7A-7D).

In some embodiments, the first in-coupler is a transmission grating (e.g., transmission grating 450-A in FIG. 4B) configured to redirect the first portion of the second light such that the first portion of the second light enters the first optical waveguide at an incident angle (e.g., the incident angle θ1) that is greater than a critical angle associated with the first optical waveguide. The critical angle is the angle of incidence above which total internal reflection occurs. The first in-coupler is disposed on a first surface of the first optical waveguide (e.g., first surface 441-A of the first optical waveguide 440) so that the second light impinges on the first optical waveguide subsequent to impinging on the first in-coupler.

In some embodiments, the first in-coupler is a reflective grating (e.g., reflective grating 450-B) configured to redirect the first portion of the second light after the second light enters the first optical waveguide, thereby causing the first portion of the second light to impinge on an internal surface of the first optical waveguide (e.g., the second surface 442-A of the first optical waveguide 440) at an incident angle (e.g., the incident angle θ1) that is greater than the critical angle of incidence. In this embodiments, the first portion of the second light impinges of the reflective grating inside the first optical waveguide. The first in-coupler is disposed on a second surface of the first optical waveguide (e.g., the second surface 442-A of the first optical waveguide 440) so that the second light impinges on the first optical waveguide prior to impinging on the first in-coupler.

In some embodiments, the first in-coupler and a portion of the first optical waveguide are positioned between the display and the reflective optical element (e.g., the first in-coupler 450 and a portion of the first optical waveguide 440 are positioned between the display 410 and the reflective optical element in FIG. 4A).

In some embodiments, the first in-coupler is configured to transmit a second portion of the second light (e.g., the first in-coupler 450 transmits the second portion 414-B of the second light 414 in FIG. 4D). The first portion of the second light has a first wavelength range and the second portion of the second light has a second wavelength range distinct from the first wavelength range.

In some embodiments, a second optical waveguide and a second in-coupler coupled with the second optical waveguide (e.g., the second optical waveguide 442 and the second in-coupler 452 in FIG. 4D). The second in-coupler is configured to receive and transmit the first light (e.g., the first light 412). The second in-coupler is further configured to receive the second portion of the second light (e.g., the second portion 414-B of the second light 414) and redirect the second portion of the second light so that the second portion of the second light undergoes total internal reflection inside the second optical waveguide (e.g., the third portion 414-C of the second light 414).

In some embodiments, the reflective optical element is a negative meniscus lens coupled with a reflective surface (e.g., the reflective optical element 460 includes lens 462 and reflective surface 462-1 in FIG. 5A). The reflective optical element is further configured to focus the first light as it is reflected such that the second light is more collimated that the first light (e.g., the second light 414 is collimated in FIG. 5A).

In some embodiments, the optical assembly further includes one or more lenses between the display and the first waveguide (e.g., lens 422 and lens 424 in FIG. 5A). In some embodiments, the one or more lenses include a first lens configured to focus the first light (e.g., lens 422). In some embodiments, the one or more lenses include a second lens of the one or more lenses is configured to reduce aberrations in an image formed by the first light (e.g., lens 424).

In accordance with some embodiments, a method of projecting light from an electronic display includes transmitting first light having a first polarization from the display through one or more optical components (e.g., FIG. 4A). The one or more optical components include a first in-coupler and a first optical waveguide (e.g., the first optical waveguide 440 and the first in-coupler 450). The method includes receiving, by a reflective optical element (e.g., the reflective optical element 460), the first light transmitted through the one or more optical components and reflecting, by the reflective optical element, the first light as second light having a second polarization distinct from the first polarization. The method includes receiving, by the first in-coupler, the second light and redirecting, by the first in-coupler, a first portion of the second light so that the first portion of second light undergoes total internal reflection inside the first optical waveguide.

In some embodiments, the first light is transmitted through the one or more optical components without change in direction or polarization (e.g., FIG. 4A).

In some embodiments, the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

In some embodiments, the liquid crystal based polarization selective element is a polarization volume grating. (e.g., the first in-coupler 450 is the PVG 700 in FIGS. 7A-7D).

In some embodiments, the first in-coupler and a section of the first optical waveguide are positioned between the display and the reflective optical element (e.g., FIG. 4A).

In some embodiments, the method further includes transmitting, by the first in-coupler, a second portion of the second light. The first portion of the second light has a first wavelength range and the second portion of the second light has a second wavelength range distinct from the first wavelength range (e.g., FIG. 4D).

In some embodiments, the one or more optical components further include a second optical waveguide and a second in-coupler coupled with the second optical waveguide (e.g., the second optical waveguide 442 and the second in-coupler 452 in FIG. 4D). The method further includes receiving, with the second in-coupler, the second portion of the second light. The method also includes redirecting, with the second in-coupler, the second portion of the second light so that the second portion of the second light undergoes total internal reflection inside the second optical waveguide.

In accordance with some embodiments, a display device (e.g., display device 400-A in FIG. 4A) includes a display, a first optical waveguide, and a reflective optical component. The display is configured to output first light having a first polarization. The reflective optical element is configured to receive the first light from the display and to reflect the first light as second light having a second polarization distinct from the first polarization. The first in-coupler is coupled with the first optical waveguide. The first in-coupler is configured to receive and transmit the first light and receive the second light and redirect a first portion of the second light so that the first portion of second light undergoes total internal reflection inside the first optical waveguide.

In some embodiments, the first light output by the display corresponds to one or more images (e.g., image 492 in FIG. 4C). The first optical waveguide is further configured to transmit light from an object outside the display device (e.g., light 490 from object 494 from outside the display device 400-A). The display device is configured to output the second portion of the second light from the first optical waveguide such that the second portion of the second light is combined with the light from the object such that the one or more images are perceived by a user of the display device together with the object (e.g., the combined image 496).

In some embodiments, the display device further includes one or more output couplers coupled with the first optical waveguide and positioned at a distance from the first in-coupler (e.g., the one or more output couplers 480 in FIG. 4A). The one or more output couplers is configured to redirect the first portion of the second light out of the first optical waveguide toward an eye of a user (e.g., the first portion 414-A of the second light 414). In some embodiments, the one or more output couplers include one or more surface relief gratings. In some embodiments, the one or more output couplers include one or more reflectors, one or more gratings, one or more tunable liquid crystal components, and/or one or more polarization volume gratings.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly for projecting light from a display, comprising:
   a first optical waveguide;
   a reflective optical element positioned to receive first light having first circular polarization and to reflect the first light as second light having second circular polarization distinct from the first circular polarization;
   a first in-coupler coupled with the first optical waveguide, the first in-coupler positioned to:
      receive from the display, and transmit toward the reflective optical element, the first light having the first circular polarization; and
      receive from the reflective optical element the second light having the second circular polarization and redirect a first portion of the second light so that the first portion of the second light undergoes total internal reflection inside the first optical waveguide,
   wherein the reflective optical element consists of a negative meniscus lens having a convex lens surface and a concave lens surface, the convex lens surface of the negative meniscus lens coupled with a reflective surface, and the reflective optical element is positioned to focus the first light as the first light is reflected such that the second light is more collimated than the first light.

2. The optical assembly of claim 1, wherein the first in-coupler is disposed between the display and the reflective optical element and is positioned to transmit the first light toward the reflective optical element while remaining polarization of the first light.

3. The optical assembly of claim 1, wherein the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

4. The optical assembly of claim 3, wherein the liquid crystal based polarization selective element is a polarization volume grating.

5. The optical assembly of claim 3, wherein the first in-coupler is a transmission grating positioned to redirect the first portion of the second light such that the first portion of the second light enters the first optical waveguide at an incident angle that is greater than a critical angle associated with the first optical waveguide.

6. The optical assembly of claim 3, wherein the first in-coupler is a reflective grating positioned to redirect the first portion of the second light after the second light enters the first optical waveguide, causing the first portion of the second light to impinge on an internal surface of the first optical waveguide at an incident angle that is greater than a critical angle of incidence.

7. The optical assembly of claim 1, wherein the first in-coupler and a portion of the first optical waveguide are positioned between the display and the reflective optical element.

8. The optical assembly of claim 1, wherein:
   the first in-coupler is positioned to transmit a second portion of the second light, and
   the first portion of the second light has a first wavelength range and the second portion of the second light has a second wavelength range distinct from the first wavelength range.

9. The optical assembly of claim 8, further including:
   a second optical waveguide; and
   a second in-coupler coupled with the second optical waveguide, the second in-coupler positioned to:
      receive from the display, and transmit toward the reflective optical element, the first light having the first circular polarization; and
      receive the second portion of the second light and redirect the second portion of the second light so that the second portion of the second light undergoes total internal reflection inside the second optical waveguide.

10. The optical assembly of claim 1, further including one or more lenses between the display and the first optical waveguide, the one or more lenses including a first lens positioned to focus the first light.

11. A method of projecting light from an electronic display, the method comprising:
   transmitting first light having first circular polarization from the electronic display through one or more optical components, the one or more optical components including a first in-coupler and a first optical waveguide;
   receiving, by a reflective optical element, the first light having the first circular polarization transmitted through the one or more optical components;
   reflecting, by the reflective optical element, the first light having the first circular polarization as second light having second circular polarization distinct from the first circular polarization;
   receiving, by the first in-coupler, the second light having the second circular polarization;
   redirecting, by the first in-coupler, a first portion of the second light having the first second circular polarization so that the first portion of the second light undergoes total internal reflection inside the first optical waveguide; and
   focusing, by the reflective optical element, the first light as the first light is reflected such that the second light is more collimated than the first light, wherein the reflective optical element consists of a negative meniscus lens having a convex lens surface and a concave lens surface and the convex lens surface of the negative meniscus lens is coupled with a reflective surface.

12. The method of claim 11, wherein the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

13. The method of claim 12, wherein the liquid crystal based polarization selective element is a polarization volume grating.

14. The method of claim 11, wherein the first in-coupler and a section of the first optical waveguide are positioned between the electronic display and the reflective optical element.

15. The method of claim 11, further comprising:
transmitting, by the first in-coupler, a second portion of the second light, wherein the first portion of the second light has a first wavelength range and the second portion of the second light has a second wavelength range distinct from the first wavelength range.

16. The method of claim 15, wherein the one or more optical components further include a second optical waveguide and a second in-coupler coupled with the second optical waveguide, the method further comprising:
receiving, with the second in-coupler, the second portion of the second light; and
redirecting, with the second in-coupler, the second portion of the second light so that the second portion of the second light undergoes total internal reflection inside the second optical waveguide.

17. A display device, comprising:
a display configured to output first light having first circular polarization;
a first optical waveguide;
a reflective optical element positioned to receive the first light having the first circular polarization from the display and to reflect the first light as second light having second circular polarization distinct from the first circular polarization; and
a first in-coupler coupled with the first optical waveguide, the first in-coupler positioned to:
receive from the display, and transmit toward the reflective optical element, the first light having the first circular polarization; and
receive from the reflective optical element the second light having the second circular polarization and redirect a first portion of the second light so that the first portion of the second light undergoes total internal reflection inside the first optical waveguide,
wherein the reflective optical element consists of a negative meniscus lens having a convex lens surface and a concave lens surface, the convex lens surface of the negative meniscus lens coupled with a reflective surface, and the reflective optical element is positioned to focus the first light as the first light is reflected such that the second light is more collimated than the first light.

18. The display device of claim 17, wherein:
the first light output by the display corresponds to one or more images;
the first optical waveguide is further positioned to transmit light from an object outside the display device; and
the display device is positioned to output a second portion of the second light from the first optical waveguide such that the second portion of the second light is combined with the light from the object such that the one or more images are perceived by a user of the display device together with the object.

19. The display device of claim 17, further comprising one or more output couplers coupled with the first optical waveguide and positioned at a distance from the first in-coupler, wherein the one or more output couplers is positioned to:
redirect the first portion of the second light out of the first optical waveguide toward an eye of a user.

* * * * *

UNITED STATES PATENT AND TRADEMARK OFFICE
CERTIFICATE OF CORRECTION

PATENT NO. : 11,048,087 B2
APPLICATION NO. : 16/436729
DATED : June 29, 2021
INVENTOR(S) : Wheelwright et al.

Page 1 of 1

It is certified that error appears in the above-identified patent and that said Letters Patent is hereby corrected as shown below:

In the Claims

Claim 11, Column 26, Line 55, please delete "having the first second circular" and insert --having the second circular--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*